(12) United States Patent
Ramaswamy et al.

(10) Patent No.: US 12,316,524 B2
(45) Date of Patent: May 27, 2025

(54) MODIFYING AN SD-WAN BASED ON FLOW METRICS

(71) Applicant: VMware LLC, Palo Alto, CA (US)

(72) Inventors: Navaneeth Krishnan Ramaswamy, Chennai (IN); Arun Kumar Srinivasan, Waterloo (CA)

(73) Assignee: VMWare LLC, Palo Alto, CA (US)

( * ) Notice: Subject to any disclaimer, the term of this patent is extended or adjusted under 35 U.S.C. 154(b) by 35 days.

(21) Appl. No.: 18/211,850

(22) Filed: Jun. 20, 2023

(65) Prior Publication Data

US 2024/0031296 A1    Jan. 25, 2024

(30) Foreign Application Priority Data

Jul. 20, 2022    (IN) .............................. 202241041530

(51) Int. Cl.
*H04L 45/02* (2022.01)
*G06F 9/455* (2018.01)
(Continued)

(52) U.S. Cl.
CPC .......... *H04L 45/02* (2013.01); *G06F 9/45558* (2013.01); *H04L 43/0876* (2013.01); *H04L 45/124* (2013.01); *H04L 47/24* (2013.01); *H04L 67/10* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 5,652,751 | A | 7/1997 | Sharony |
| 5,909,553 | A | 6/1999 | Campbell et al. |

(Continued)

FOREIGN PATENT DOCUMENTS

| | | |
|---|---|---|
| CN | 1926809 A | 3/2007 |
| CN | 102577270 A | 7/2012 |

(Continued)

OTHER PUBLICATIONS

Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

(Continued)

*Primary Examiner* — Ranodhi Serrao
(74) *Attorney, Agent, or Firm* — Quarles & Brady LLP

(57) ABSTRACT

Some embodiments provide a method for modifying an SD-WAN (software-defined wide-area network). The method collects, from a set of managed forwarding elements (MFEs), multiple metrics associated with multiple data message flows sent between the set of MFEs. The method analyzes the collected multiple metrics to group the data message flows according to multiple types and to identify a ranking of the multiple groups of data message flows according to traffic throughput. The method uses the ranking to identify a set of one or more groups of data message flows. The method modifies the SD-WAN to improve forwarding through the SD-WAN for the identified set of one or more groups of data message flows.

16 Claims, 12 Drawing Sheets

(51) Int. Cl.
*H04L 43/0876* (2022.01)
*H04L 45/12* (2022.01)
*H04L 47/24* (2022.01)
*H04L 67/10* (2022.01)

(56) References Cited

U.S. PATENT DOCUMENTS

| | | |
|---|---|---|
| 6,154,465 A | 11/2000 | Pickett |
| 6,157,648 A | 12/2000 | Voit et al. |
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,751,409 B1 | 7/2010 | Carolan |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,516,129 B1 | 8/2013 | Skene |
| 8,566,452 B1 | 10/2013 | Goodwin, III et al. |
| 8,588,066 B2 | 11/2013 | Goel et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,797,874 B2 | 8/2014 | Yu et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,015,299 B1 | 4/2015 | Shah |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,100,329 B1 | 8/2015 | Jiang et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,225,591 B2 | 12/2015 | Beheshti-Zavareh et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Asiao et al. |
| 9,432,245 B1 | 8/2016 | Sorenson, III et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,542,219 B1 | 1/2017 | Bryant et al. |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,614,748 B1 | 4/2017 | Battersby et al. |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,692,714 B1 | 6/2017 | Nair et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,923,826 B2 | 3/2018 | Murgia |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Xu |
| 10,116,593 B1 | 10/2018 | Sinn et al. |
| 10,135,789 B2 | 11/2018 | Mayya et al. |
| 10,142,226 B1 | 11/2018 | Wu et al. |
| 10,178,032 B1 | 1/2019 | Freitas |
| 10,178,037 B2 | 1/2019 | Appleby et al. |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchal et al. |
| 10,382,352 B2 * | 8/2019 | Gamage ............... H04L 41/122 |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 * | 12/2019 | Mayya .................... H04L 41/12 |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,482 B2 | 2/2020 | Oré et al. |
| 10,574,528 B2 | 2/2020 | Mayya et al. |
| 10,594,516 B2 * | 3/2020 | Cidon .................. H04L 45/745 |
| 10,594,591 B2 | 3/2020 | Houjyo et al. |
| 10,594,659 B2 | 3/2020 | El-Moussa et al. |
| 10,608,844 B2 | 3/2020 | Cidon et al. |
| 10,630,505 B2 | 4/2020 | Rubenstein et al. |
| 10,637,889 B2 | 4/2020 | Ermagan et al. |

(56) References Cited

U.S. PATENT DOCUMENTS

| | | |
|---|---|---|
| 10,666,460 B2 | 5/2020 | Cidon et al. |
| 10,666,497 B2 | 5/2020 | Tahhan et al. |
| 10,686,625 B2 | 6/2020 | Cidon et al. |
| 10,693,739 B1 | 6/2020 | Naseri et al. |
| 10,708,144 B2 | 7/2020 | Mohan et al. |
| 10,715,427 B2 | 7/2020 | Raj et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Puan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 * | 4/2021 | Michael ............... H04L 41/122 |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,595 B2 | 8/2021 | Knutsen et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,146,632 B2 | 10/2021 | Rubenstein |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,349,722 B2 | 5/2022 | Mayya et al. |
| 11,363,124 B2 | 6/2022 | Markuze et al. |
| 11,374,904 B2 | 6/2022 | Mayya et al. |
| 11,375,005 B1 | 6/2022 | Rolando et al. |
| 11,381,474 B1 | 7/2022 | Kumar et al. |
| 11,381,499 B1 | 7/2022 | Ramaswamy et al. |
| 11,388,086 B1 | 7/2022 | Ramaswamy et al. |
| 11,394,640 B2 | 7/2022 | Ramaswamy et al. |
| 11,418,997 B2 | 8/2022 | Devadoss et al. |
| 11,438,789 B2 | 9/2022 | Devadoss et al. |
| 11,444,865 B2 | 9/2022 | Ramaswamy et al. |
| 11,444,872 B2 | 9/2022 | Mayya et al. |
| 11,477,127 B2 | 10/2022 | Ramaswamy et al. |
| 11,489,720 B1 | 11/2022 | Kempanna et al. |
| 11,489,783 B2 | 11/2022 | Ramaswamy et al. |
| 11,509,571 B1 | 11/2022 | Ramaswamy et al. |
| 11,516,049 B2 | 11/2022 | Cidon et al. |
| 11,522,780 B1 | 12/2022 | Wallace et al. |
| 11,526,434 B1 | 12/2022 | Brooker et al. |
| 11,533,248 B2 | 12/2022 | Mayya et al. |
| 11,552,874 B1 | 1/2023 | Pragada et al. |
| 11,575,591 B2 | 2/2023 | Ramaswamy et al. |
| 11,575,600 B2 | 2/2023 | Markuze et al. |
| 11,582,144 B2 | 2/2023 | Ramaswamy et al. |
| 11,582,298 B2 | 2/2023 | Hood et al. |
| 11,601,356 B2 | 3/2023 | Gandhi et al. |
| 11,606,225 B2 | 3/2023 | Cidon et al. |
| 11,606,286 B2 | 3/2023 | Michael et al. |
| 11,606,314 B2 | 3/2023 | Cidon et al. |
| 11,606,712 B2 | 3/2023 | Devadoss et al. |
| 11,611,507 B2 | 3/2023 | Ramaswamy et al. |
| 11,637,768 B2 | 4/2023 | Ramaswamy et al. |
| 11,677,720 B2 | 6/2023 | Mayya et al. |
| 11,689,959 B2 | 6/2023 | Devadoss et al. |
| 11,700,196 B2 | 7/2023 | Michael et al. |
| 11,706,126 B2 | 7/2023 | Silva et al. |
| 11,706,127 B2 | 7/2023 | Michael et al. |
| 11,709,710 B2 | 7/2023 | Markuze et al. |
| 11,716,286 B2 | 8/2023 | Ramaswamy et al. |
| 11,722,925 B2 | 8/2023 | Devadoss et al. |
| 11,729,065 B2 | 8/2023 | Ramaswamy et al. |
| 2002/0049687 A1 | 4/2002 | Helsper et al. |
| 2002/0075542 A1 | 6/2002 | Kumar et al. |
| 2002/0085488 A1 | 7/2002 | Kobayashi |
| 2002/0087716 A1 | 7/2002 | Mustafa |
| 2002/0152306 A1 | 10/2002 | Tuck |
| 2002/0186682 A1 | 12/2002 | Kawano et al. |
| 2002/0198840 A1 | 12/2002 | Banka et al. |
| 2003/0050061 A1 | 3/2003 | Wu et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0210479 A1 | 9/2005 | Andjelic |
| 2005/0265255 A1 | 12/2005 | Kodialam et al. |
| 2006/0002291 A1 | 1/2006 | Alicherry et al. |
| 2006/0034335 A1 | 2/2006 | Karaoguz et al. |
| 2006/0114256 A1 | 6/2006 | Mandavilli et al. |
| 2006/0171365 A1 | 8/2006 | Borella |
| 2006/0182034 A1 * | 8/2006 | Klinker ............... H04L 45/3065 370/248 |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2006/0195605 A1 | 8/2006 | Sundarrajan et al. |
| 2006/0245414 A1 | 11/2006 | Susai et al. |
| 2007/0050594 A1 | 3/2007 | Augsburg et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1 | 7/2007 | Chu et al. |
| 2007/0177511 A1 | 8/2007 | Das et al. |
| 2007/0195797 A1 | 8/2007 | Patel et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |

(56) References Cited

U.S. PATENT DOCUMENTS

| | | |
|---|---|---|
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0168086 A1 | 7/2008 | Miller et al. |
| 2008/0175150 A1 | 7/2008 | Bolt et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2008/0263218 A1 | 10/2008 | Beerends et al. |
| 2009/0013210 A1 | 1/2009 | McIntosh et al. |
| 2009/0028092 A1 | 1/2009 | Rothschild |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0128600 A1 | 5/2010 | Srinivasmurthy et al. |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0001604 A1 | 1/2011 | Ludlow et al. |
| 2011/0007752 A1 | 1/2011 | Silva et al. |
| 2011/0032939 A1 | 2/2011 | Nozaki et al. |
| 2011/0035187 A1 | 2/2011 | DeJori et al. |
| 2011/0040814 A1 | 2/2011 | Higgins |
| 2011/0075674 A1 | 3/2011 | Li et al. |
| 2011/0078783 A1 | 3/2011 | Duan et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0266026 A1 | 10/2012 | Chikkalingaiah et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0007505 A1 | 1/2013 | Spear |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173768 A1 | 7/2013 | Kundu et al. |
| 2013/0173788 A1 | 7/2013 | Song |
| 2013/0182712 A1 | 7/2013 | Aguayo et al. |
| 2013/0185446 A1 | 7/2013 | Zeng et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0235870 A1 | 9/2013 | Tripathi et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0157363 A1 | 6/2014 | Banerjee |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0189074 A1 | 7/2014 | Parker |
| 2014/0208317 A1 | 7/2014 | Nakagawa |
| 2014/0219135 A1 | 8/2014 | Li et al. |
| 2014/0223507 A1 | 8/2014 | Xu |

(56) References Cited

U.S. PATENT DOCUMENTS

| | | |
|---|---|---|
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0310282 A1 | 10/2014 | Sprague et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0355441 A1 | 12/2014 | Jain |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0106809 A1 | 4/2015 | Reddy et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0264055 A1 | 9/2015 | Budhani et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0326426 A1 | 11/2015 | Luo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358232 A1 | 12/2015 | Chen et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381462 A1 | 12/2015 | Choi et al. |
| 2015/0381493 A1 | 12/2015 | Bansal et al. |
| 2016/0019317 A1 | 1/2016 | Pawar et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080268 A1 | 3/2016 | Anand et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134527 A1 | 5/2016 | Kwak et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0147607 A1 | 5/2016 | Dornemann et al. |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1 | 8/2016 | Jiao |
| 2016/0234161 A1 | 8/2016 | Banerjee et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0299775 A1 | 10/2016 | Madapurath et al. |
| 2016/0301471 A1 | 10/2016 | Kunz et al. |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0024260 A1 | 1/2017 | Chandrasekaran et al. |
| 2017/0026273 A1 | 1/2017 | Yao et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063783 A1 | 3/2017 | Yong et al. |

(56) References Cited

U.S. PATENT DOCUMENTS

| | | |
|---|---|---|
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155566 A1 | 6/2017 | Martinsen et al. |
| 2017/0155590 A1 | 6/2017 | Dillon et al. |
| 2017/0163473 A1 | 6/2017 | Sadana et al. |
| 2017/0171024 A1 | 6/2017 | Anerousis et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201568 A1 | 7/2017 | Hussam et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0242784 A1 | 8/2017 | Heorhiadi et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302501 A1 | 10/2017 | Shi et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317945 A1 | 11/2017 | Guo et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339022 A1 | 11/2017 | Hegde et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0091370 A1 | 3/2018 | Arai |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0181423 A1 | 6/2018 | Gunda et al. |
| 2018/0205746 A1 | 7/2018 | Boutnaru et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0261085 A1 | 9/2018 | Liu et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0359323 A1 | 12/2018 | Madden |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1* | 12/2018 | Mayya ................ H04L 47/22 |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0021085 A1 | 1/2019 | Mochizuki et al. |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0081894 A1 | 3/2019 | Yousaf et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |

(56) References Cited

U.S. PATENT DOCUMENTS

| | | |
|---|---|---|
| 2019/0103993 A1 | 4/2019 | Cidon et al. |
| 2019/0104035 A1* | 4/2019 | Cidon .................. H04M 15/51 |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1* | 4/2019 | Cidon ................. H04L 12/1428 |
| 2019/0104413 A1* | 4/2019 | Cidon ................. H04L 12/4625 |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0132322 A1 | 5/2019 | Song et al. |
| 2019/0140889 A1 | 5/2019 | Mayya et al. |
| 2019/0140890 A1 | 5/2019 | Mayya et al. |
| 2019/0149525 A1 | 5/2019 | Gunda et al. |
| 2019/0158371 A1 | 5/2019 | Dillon et al. |
| 2019/0158605 A1* | 5/2019 | Markuze ............... H04L 69/163 |
| 2019/0199539 A1 | 6/2019 | Deng et al. |
| 2019/0220703 A1 | 7/2019 | Prakash et al. |
| 2019/0222499 A1 | 7/2019 | Chen et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0238497 A1 | 8/2019 | Tourrilhes et al. |
| 2019/0268421 A1* | 8/2019 | Markuze ................ H04L 67/10 |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1 | 10/2019 | Degioanni |
| 2019/0306282 A1 | 10/2019 | Masputra et al. |
| 2019/0313278 A1 | 10/2019 | Liu |
| 2019/0313907 A1 | 10/2019 | Khachaturian et al. |
| 2019/0319847 A1 | 10/2019 | Nahar et al. |
| 2019/0319881 A1 | 10/2019 | Maskara et al. |
| 2019/0327109 A1 | 10/2019 | Guichard et al. |
| 2019/0334786 A1 | 10/2019 | Dutta et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1* | 1/2020 | Michael .................. H04L 43/08 |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0067831 A1 | 2/2020 | Spraggins et al. |
| 2020/0092207 A1 | 3/2020 | Sipra et al. |
| 2020/0097327 A1 | 3/2020 | Beyer et al. |
| 2020/0099625 A1 | 3/2020 | Yigit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0267203 A1 | 8/2020 | Jindal et al. |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344089 A1 | 10/2020 | Motwani et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0403821 A1 | 12/2020 | Dev et al. |
| 2020/0412483 A1 | 12/2020 | Tan et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0021538 A1 | 1/2021 | Meck et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0037159 A1 | 2/2021 | Shimokawa |
| 2021/0049191 A1 | 2/2021 | Masson et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0073001 A1 | 3/2021 | Rogers et al. |
| 2021/0092062 A1 | 3/2021 | Dhanabalan et al. |
| 2021/0099360 A1 | 4/2021 | Parsons et al. |
| 2021/0105199 A1 | 4/2021 | H et al. |
| 2021/0111998 A1 | 4/2021 | Saavedra |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |

(56) References Cited

U.S. PATENT DOCUMENTS

| | | |
|---|---|---|
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0176255 A1 | 6/2021 | Hill et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0314385 A1 | 10/2021 | Pande et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0400512 A1 | 12/2021 | Agarwal et al. |
| 2021/0409277 A1 | 12/2021 | Jeuk et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0029902 A1 | 1/2022 | Shemer et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0045927 A1 | 2/2022 | Liu et al. |
| 2022/0052928 A1 | 2/2022 | Sundararajan et al. |
| 2022/0061059 A1 | 2/2022 | Dunsmore et al. |
| 2022/0086035 A1 | 3/2022 | Devaraj et al. |
| 2022/0094644 A1 | 3/2022 | Cidon et al. |
| 2022/0123961 A1 | 4/2022 | Mukundan et al. |
| 2022/0131740 A1 | 4/2022 | Mayya et al. |
| 2022/0131807 A1 | 4/2022 | Srinivas et al. |
| 2022/0131898 A1 | 4/2022 | Hooda et al. |
| 2022/0141184 A1 | 5/2022 | Oswal et al. |
| 2022/0158923 A1 | 5/2022 | Ramaswamy et al. |
| 2022/0158924 A1 | 5/2022 | Ramaswamy et al. |
| 2022/0158926 A1 | 5/2022 | Wennerström et al. |
| 2022/0166713 A1 | 5/2022 | Markuze et al. |
| 2022/0191719 A1 | 6/2022 | Roy |
| 2022/0198229 A1 | 6/2022 | López et al. |
| 2022/0210035 A1 | 6/2022 | Hendrickson et al. |
| 2022/0210041 A1 | 6/2022 | Gandhi et al. |
| 2022/0210042 A1 | 6/2022 | Gandhi et al. |
| 2022/0210122 A1 | 6/2022 | Levin et al. |
| 2022/0217015 A1 | 7/2022 | Vuggrala et al. |
| 2022/0231949 A1 | 7/2022 | Ramaswamy et al. |
| 2022/0231950 A1 | 7/2022 | Ramaswamy et al. |
| 2022/0232411 A1 | 7/2022 | Vijayakumar et al. |
| 2022/0239596 A1 | 7/2022 | Kumar et al. |
| 2022/0294701 A1 | 9/2022 | Mayya et al. |
| 2022/0335027 A1 | 10/2022 | Seshadri et al. |
| 2022/0337553 A1 | 10/2022 | Mayya et al. |
| 2022/0353152 A1 | 11/2022 | Ramaswamy |
| 2022/0353171 A1 | 11/2022 | Ramaswamy et al. |
| 2022/0353175 A1 | 11/2022 | Ramaswamy et al. |
| 2022/0353182 A1 | 11/2022 | Ramaswamy et al. |
| 2022/0353190 A1 | 11/2022 | Ramaswamy et al. |
| 2022/0360500 A1 | 11/2022 | Ramaswamy et al. |
| 2022/0407773 A1 | 12/2022 | Kempanna et al. |
| 2022/0407774 A1 | 12/2022 | Kempanna et al. |
| 2022/0407790 A1 | 12/2022 | Kempanna et al. |
| 2022/0407820 A1 | 12/2022 | Kempanna et al. |
| 2022/0407915 A1 | 12/2022 | Kempanna et al. |
| 2023/0006929 A1 | 1/2023 | Mayya et al. |
| 2023/0025586 A1 | 1/2023 | Rolando et al. |
| 2023/0026330 A1 | 1/2023 | Rolando et al. |
| 2023/0026865 A1 | 1/2023 | Rolando et al. |
| 2023/0028872 A1 | 1/2023 | Ramaswamy |
| 2023/0039869 A1 | 2/2023 | Ramaswamy et al. |
| 2023/0041916 A1 | 2/2023 | Zhang et al. |
| 2023/0054961 A1 | 2/2023 | Ramaswamy et al. |
| 2023/0105680 A1 | 4/2023 | Simlai et al. |
| 2023/0121871 A1 | 4/2023 | Mayya et al. |
| 2023/0179445 A1 | 6/2023 | Cidon et al. |
| 2023/0179502 A1 | 6/2023 | Ramaswamy et al. |
| 2023/0179521 A1 | 6/2023 | Markuze et al. |
| 2023/0179543 A1 | 6/2023 | Cidon et al. |
| 2023/0216768 A1 | 7/2023 | Zohar et al. |
| 2023/0216801 A1 | 7/2023 | Markuze et al. |
| 2023/0216804 A1 | 7/2023 | Zohar et al. |
| 2023/0221874 A1 | 7/2023 | Markuze et al. |
| 2023/0224356 A1 | 7/2023 | Markuze et al. |
| 2023/0224759 A1 | 7/2023 | Ramaswamy |
| 2023/0231845 A1 | 7/2023 | Manoharan et al. |
| 2023/0239234 A1* | 7/2023 | Zohar ................ H04L 45/123 370/389 |
| 2023/0261974 A1 | 8/2023 | Ramaswamy et al. |
| 2024/0028378 A1* | 1/2024 | Ramaswamy ...... G06F 9/45558 |

FOREIGN PATENT DOCUMENTS

| | | |
|---|---|---|
| CN | 102811165 A | 12/2012 |
| CN | 104956329 A | 9/2015 |
| CN | 106230650 A | 12/2016 |
| CN | 106656847 A | 5/2017 |
| CN | 106998284 A | 8/2017 |
| CN | 110447209 A | 11/2019 |
| CN | 111198764 A | 5/2020 |
| EP | 1912381 A1 | 4/2008 |
| EP | 2538637 A2 | 12/2012 |
| EP | 2763362 A1 | 8/2014 |
| EP | 3041178 A1 | 7/2016 |
| EP | 3297211 A1 | 3/2018 |
| EP | 3509256 A1 | 7/2019 |
| EP | 3346650 B1 | 11/2019 |
| JP | 2002368792 A | 12/2002 |
| JP | 2010233126 A | 10/2010 |
| JP | 2014200010 A | 10/2014 |
| JP | 2017059991 A | 3/2017 |
| JP | 2017524290 A | 8/2017 |
| KR | 20170058201 A | 5/2017 |
| RU | 2574350 C2 | 2/2016 |
| WO | 03073701 A1 | 9/2003 |
| WO | 2005071861 A1 | 8/2005 |
| WO | 2007016834 A1 | 2/2007 |
| WO | 2012167184 A2 | 12/2012 |
| WO | 2015092565 A1 | 6/2015 |
| WO | 2016061546 A1 | 4/2016 |
| WO | 2016123314 A1 | 8/2016 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020091777 A1 | 5/2020 |
| WO | 2020101922 A1 | 5/2020 |
| WO | 2020112345 A1 | 6/2020 |
| WO | 2021040934 A1 | 3/2021 |
| WO | 2021118717 A1 | 6/2021 |
| WO | 2021150465 A1 | 7/2021 |
| WO | 2021211906 A1 | 10/2021 |
| WO | 2022005607 A1 | 1/2022 |
| WO | 2022082680 A1 | 4/2022 |
| WO | 2022154850 A1 | 7/2022 |
| WO | 2022159156 A1 | 7/2022 |
| WO | 2022231668 A1 | 11/2022 |

(56) References Cited

FOREIGN PATENT DOCUMENTS

| | | | |
|---|---|---|---|
| WO | 2022235303 | A1 | 11/2022 |
| WO | 2022265681 | A1 | 12/2022 |
| WO | 2023009159 | A1 | 2/2023 |

OTHER PUBLICATIONS

Taleb, Tarik, "D4.1 Mobile Network Cloud Component Design," Mobile Cloud Networking, Nov. 8, 2013, 210 pages, MobileCloud Networking Consortium, retrieved from http://www.mobile-cloud-networking.eu/site/index.php?process=download&id=127&code=89d30565cd2ce087d3f8e95f9ad683066510a61f.

Tootaghaj, Diman Zad, et al., "Homa: An Efficient Topology and Route Management Approach in SD-WAN Overlays," IEEE Infocom 2020—IEEE Conference on Computer Communications, Jul. 6-9, 2020, 10 pages, IEEE, Toronto, ON, Canada.

Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Xie, Junfeng, et al., A Survey of Machine Learning Techniques Applied to Software Defined Networking (SDN): Research Issues and Challenges,IEEE Communications Surveys & Tutorials, Aug. 23, 2018, 38 pages, vol. 21, Issue 1, IEEE.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Author Unknown, "VeloCloud Administration Guide: VMware SD-WAN by VeloCloud 3.3," Month Unknown 2019, 366 pages, VMware, Inc., Palo Alto, CA, USA.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozet, Jean-Marc, "Cisco SDWAN," Deep Dive, Dec. 2017, 185 pages, Cisco, Retrieved from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE Infocom 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.

Guo, Xiangyi, et al., (U.S. Appl. No. 62/925,193), filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned Related International Patent Application PCT/US2023/025795 with similar specification, filed Jun. 21, 2023, 45 pages, VMware, Inc.

Non-Published Commonly Owned U.S. Appl. No. 17/833,555, filed Jun. 6, 2022, 34 pages, VMware, Inc.

Non-Published Commonly Owned U.S. Appl. No. 17/833,566, filed Jun. 6, 2022, 35 pages, VMware, Inc.

Non-Published Commonly Owned U.S. Appl. No. 17/976,717, filed Oct. 28, 2022, 37 pages, VMware, Inc.

Non-Published Commonly Owned U.S. Appl. No. 18/100,369, filed Jan. 23, 2023, 55 pages, VMware, Inc.

Non-Published Commonly Owned U.S. Appl. No. 18/100,381, filed Jan. 23, 2023, 55 pages, VMware, Inc.

Non-Published Commonly Owned U.S. Appl. No. 18/100,397, filed Jan. 23, 2023, 55 pages, VMware, Inc.

Non-Published Commonly Owned U.S. Appl. No. 18/126,989, filed Mar. 27, 2023, 83 pages, VMware, Inc.

(56) References Cited

OTHER PUBLICATIONS

Non-Published Commonly Owned U.S. Appl. No. 18/126,990, filed Mar. 27, 2023, 84 pages, VMware, Inc.
Non-Published Commonly Owned U.S. Appl. No. 18/126,991, filed Mar. 27, 2023, 84 pages, VMware, Inc.
Non-Published Commonly Owned U.S. Appl. No. 18/126,992, filed Mar. 27, 2023, 84 pages, VMware, Inc.
Non-Published Commonly Owned U.S. Appl. No. 18/197,090, filed May 14, 2023, 36 pages, Nicira, Inc.
Non-Published Commonly Owned U.S. Appl. No. 18/208,352, filed Jun. 12, 2023, 69 pages, VMware, Inc.
Non-Published Commonly Owned U.S. Appl. No. 18/208,356, filed Jun. 12, 2023, 69 pages, VMware, Inc.
Non-Published Commonly Owned U.S. Appl. No. 18/208,358, filed Jun. 12, 2023, 69 pages, VMware, Inc.
Non-Published Commonly Owned U.S. Appl. No. 18/211,568, filed Jun. 19, 2023, 37 pages, VMware, Inc.
Non-Published Commonly Owned U.S. Appl. No. 18/211,576, filed Jun. 19, 2023, 37 pages, VMware, Inc.
Non-Published Commonly Owned U.S. Appl. No. 18/211,578, filed Jun. 19, 2023, 36 pages, VMware, Inc.
Non-Published Commonly Owned Related U.S. Appl. No. 18/211,820 with similar specification, filed Jun. 20, 2023, 43 pages, VMware, Inc.
Non-Published Commonly Owned Related U.S. Appl. No. 18/211,842 with similar specification, filed Jun. 20, 2023, 43 pages, VMware, Inc.
Non-Published Commonly Owned U.S. Appl. No. 18/222,864, filed Jul. 17, 2023, 350 pages, VMware, Inc.
Non-Published Commonly Owned U.S. Appl. No. 18/222,868, filed Jul. 17, 2023, 22 pages, VMware, Inc.
Non-Published Commonly Owned U.S. Appl. No. 18/224,466, filed Jul. 20, 2023, 56 pages, VMware, Inc.
Non-Published Commonly Owned U.S. Appl. No. 18/235,879, filed Aug. 20, 2023, 173 pages, VMware, Inc.
Non-Published Commonly Owned U.S. Appl. No. 15/803,964, filed Nov. 6, 2017, 15 pages, The Mode Group.
Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

\* cited by examiner

MODIFYING AN SD-WAN BASED ON FLOW METRICS

BACKGROUND

Today, cloud-based applications are deployed across hybrid clouds and multiclouds for both availability and resiliency. However, today's SD-WAN network has standard policies that are static in nature for reliable and secure connectivity toward cloud-based applications, which can lead to sub-optimal routing and degraded user experience. Currently, cloud-based transits are provisioned across different regions around the globe in close proximity to cloud-based applications, driven primarily by business values. As a result, considerations for evolving needs of next generation cloud-native applications are lost. Additionally, secure and resilient services are statically provisioned to act as a waypoint for dynamic application clusters, leading to suboptimal performance and/or application degradation due to the placement of the services, which tend to be located closely to sources rather than destinations.

BRIEF SUMMARY

Some embodiments of the invention provide a method for generating a heat map and using the generated heat map to modify an SD-WAN (software-defined wide-area network) deployed for a set of geographic locations. The application traffic are handled as flows which are forwarded through a set of managed forwarding elements (MFEs) that generates multiple metrics associated to each of the flows. Based on the collected metrics, the method generates a heat map that accounts for the multiple data message flows, locations of the set of MFEs, and locations of destinations of the data message flows (e.g., SD-WAN applications hosted by public or private datacenters, SaaS (software as a service) applications hosted by third-party datacenters, etc.). The method uses the generated heat map to identify at least one modification to make to the SD-WAN to improve forwarding of the data message flows.

In some embodiments, the method is performed by a management and control server (e.g., Velocloud Orchestrator (VCO)) or cluster of management and control servers for the SD-WAN. The management and control server of some embodiments collects the metrics from the set of MFEs by collecting the metrics from a compute machine designated for collected metrics and location context associated with data message flows in the SD-WAN from the set of MFEs. In some embodiments, the metrics collected by the designated compute machine include quality of experience (QoE) metrics, such as loss rate, packet delay rate, packet jitter rate, and throughput. The designated compute machine, in some embodiments, uses the collected QoE metrics to compute multiple QoE scores associated with the data message flows, and the metrics collected by the management and control server include the QoE scores. In some embodiments, the QoE scores specify traffic densities associated with the data message flows which can be used in conjunction with the heat map to identify modifications to make to the SD-WAN.

The set of MFEs, in some embodiments, include edge routers, cloud gateway routers, and hub routers for connecting datacenters to the SD-WAN. The edge routers of some embodiments are deployed at the edges of datacenters (e.g., branch sites, cloud datacenters, etc.) of an enterprise network for which the SD-WAN is implemented, and connect these datacenters to other forwarding elements (e.g., hub routers and gateway routers) of the SD-WAN. In some embodiments, the gateway routers connect the edge routers to third-party datacenters through the SD-WAN, and, in some embodiments, also perform other operations for the SD-WAN such as route advertisement. The edge routers connect to the cloud gateway routers via two channels, according to some embodiments, with one channel being a secure channel and the other channel being an unsecured channel. The hub routers of some embodiments connect different edge routers to each other. For instance, the hub routers connect edge routers at branch sites to other edge routers at other branch sites and at datacenters that host SD-WAN applications, in some embodiments.

In some embodiments, the heat map groups destinations into various destination clusters based on geographic proximity of the destinations to each other. For instance, multiple SaaS applications may be distributed across a large geographic area (e.g., the United States), with some locations of the geographic area having higher concentrations of SaaS applications than other locations (e.g., higher concentrations near large metropolitan areas). In some embodiments, any modifications to the SD-WAN are identified by first identifying a particular destination cluster at a particular location that does not include a geographically proximate MFE for forwarding data message flows to and from the particular destination cluster, and then provisioning and deploying a new MFE to the particular location to improve forwarding to and from the particular destination cluster.

In another example, some embodiments use the heat map to identify any destination clusters experiencing congestion due to high volumes of traffic to those destination clusters. In some embodiments, the locations of the identified destination clusters may already have one or more local MFEs for forwarding data message flows to and from the destination clusters, and new MFEs may be provisioned and deployed to these locations to increase the amount of resources available for forwarding data message flows to and from those destination clusters. Conversely, or conjunctively, some embodiments may implement other modifications, such as modifying physical links at branch sites and datacenters.

In some embodiments, the heat map is used to identify SD-WAN applications needing improvements. For instance, metrics (e.g., throughput, latency, packet loss, and jitter) associated with a particular SD-WAN application may indicate anomalies detected by MFEs when processing data message flows to and from the particular SD-WAN application. Based on the detected anomaly or anomalies, some embodiments modify a number of edge forwarding elements (e.g., edge routers) that connect datacenters to each other through the SD-WAN, a number of hubs (e.g., hub routers) that connect edge forwarding elements to each other through the SD-WAN, and/or link capacities of a set of links used to connect to the particular SD-WAN application. Examples of SD-WAN applications include VOIP applications, database applications, and applications for running virtual machines (VMs), according to some embodiments.

A visualization of the heat map is presented through a user interface (UI) for viewing and analysis by a user (e.g., network administrator), in some embodiments. The UI is provided in some embodiments by the management and control server, which, in some embodiments, also generates the heat map. In some embodiments, the visualization includes representations of the data message flows, representations of the set of MFEs at their respective locations, and representations of the destination and one or more destination clusters at their respective locations, according to some embodiments.

In some embodiments, the visualization is a map of the geographic area across which the SD-WAN is deployed, and with the representations of the MFEs, destinations, destination clusters, and data message flows overlaying the map. In addition to providing the visualization, the UI of some embodiments also enables the user to identify and select modifications to the SD-WAN for implementation by the components (i.e., management and control server, MFEs, etc.) of the SD-WAN. For example, the user may cause the management and control server to provision and deploy an additional cloud gateway router, and also define forwarding rules associated with the additional MFE for use by, e.g., edge routers of the SD-WAN.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
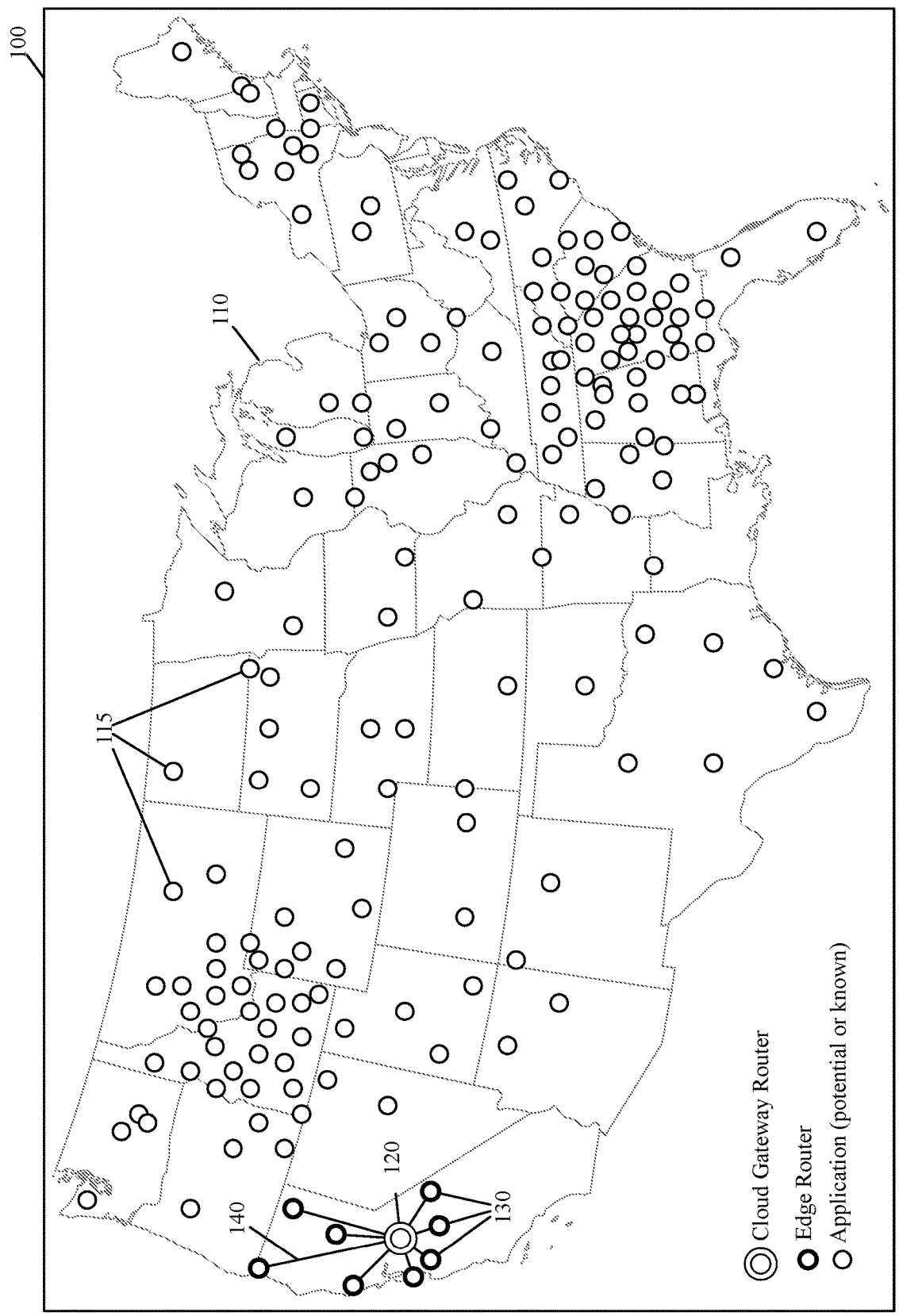
FIG. 1 illustrates an example of a visualization of a simplified heat map for an SD-WAN of a particular entity generated in some embodiments and presented through a UI.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for generating a heat map and using the generated heat map to modify an SD-WAN (software-defined wide-area network) deployed for a set of geographic locations. From a set of managed forwarding elements (MFEs) that forward data message flows through the SD-WAN, the method collects multiple metrics associated with the data message flows (e.g., metrics generated by MFEs processing the data messages flows). Based on the collected metrics, the method generates a heat map that accounts for the multiple data message flows, locations of the set of MFEs, and locations of destinations of the data message flows (e.g., SD-WAN applications hosted by public or private datacenters, SaaS (software as a service) applications hosted by third-party datacenters, etc.). The method uses the generated heat map to identify at least one modification to make to the SD-WAN to improve forwarding of the data message flows.

In some embodiments, the method is performed by a management and control server (e.g., Velocloud Orchestrator (VCO)) or cluster of management and control servers for the SD-WAN. The management and control server of some embodiments collects the metrics from the set of MFEs by collecting the metrics from a compute machine designated for collected metrics and location context associated with data message flows in the SD-WAN from the set of MFEs. In some embodiments, the metrics collected by the designated compute machine include quality of experience (QoE) metrics, such as loss rate, packet delay rate, packet jitter rate, and throughput. The designated compute machine, in some embodiments, uses the collected QoE metrics to compute multiple QoE scores associated with the data message flows, and the metrics collected by the management and control server include the QoE scores. In some embodiments, the QoE scores specify traffic densities associated with the data message flows which can be used in conjunction with the heat map to identify modifications to make to the SD-WAN.

The set of MFEs, in some embodiments, include edge routers, cloud gateway routers, and hub routers for connecting datacenters to the SD-WAN. The edge routers of some embodiments are deployed at the edges of datacenters (e.g., branch sites, cloud datacenters, etc.) of an enterprise network for which the SD-WAN is implemented, and connect these datacenters to other forwarding elements (e.g., hub routers and gateway routers) of the SD-WAN. In some embodiments, the gateway routers connect the edge routers to third-party datacenters through the SD-WAN, and, in some embodiments, also perform other operations for the SD-WAN such as router advertisement. The edge routers connect to the cloud gateway routers via two channels, according to some embodiments, with one channel being a secure channel and the other channel being an unsecured channel. The hub routers of some embodiments connect different edge routers to each other. For instance, the hub routers connect edge routers at branch sites to other edge routers at other branch sites and at datacenters that host SD-WAN applications, in some embodiments.

FIG. 1 illustrates an example of a visualization of a simplified heat map for an SD-WAN of a particular entity generated in some embodiments and presented through a UI. The heat map is generated, in some embodiments, by a management and control server for the SD-WAN (e.g., Velocloud Orchestrator (VCO)), and the visualization 100 is presented through a UI also provided by the management and control server. The management and control server, in some embodiments, is a centralized controller, while in other embodiments it is a distributed controller with controller agents executing on devices in the SD-WAN (e.g., on the forwarding elements described below). In still other embodiments, the controller is a cloud gateway that performs the functionalities of a controller, or the controller and the cloud gateway share controller functionalities.

As shown, the visualization 100 includes a map 110 of the geographical area covered by the SD-WAN and being analyzed for potential modifications. Across the map 110, multiple applications 115 are distributed. In some embodiments, each application 115 represents a currently running application (i.e., an application known by the SD-WAN), while in other embodiments, each application 115 represents a potential application, and in still other embodiments, the applications 115 represent a combination of currently running applications and potential applications. It should be noted that while the visualization 100 is illustrated in black and white, other embodiments of the invention present the heat map using a variety of colors to distinguish between the different components of the heat map, as will be further described below. For instance, currently running applications and potential applications may be presented differently (e.g., different colors, different intensity of colors, different opacities, etc.), according to some embodiments.

In addition to the applications 115, the map 110 also includes a cloud gateway 120 (i.e., cloud gateway router) and multiple edge routers 130 connected to the cloud gateway 120 via links 140. The edge routers of some embodiments are edge machines (e.g., virtual machines (VMs), containers, programs executing on computers, etc.) and/or standalone appliances that operate at multi-computer locations of the particular entity (e.g., at an office or datacenter of the entity) to connect the computers at their respective locations to other elements (e.g., gateways, hubs, etc.) in the virtual network. In some embodiments, the elements are clusters of elements at each of the branch sites. In other embodiments, the edge elements are deployed to each of the branch sites as high-availability pairs such that one edge element in the pair is the active element and the other edge element in the pair is the standby element that can take over as the active edge element in case of failover.

An example of an entity for which such a virtual network can be established includes a business entity (e.g., a corporation), a non-profit entity (e.g., a hospital, a research organization, etc.), and an education entity (e.g., a university, a college, etc.), or any other type of entity. Examples of public cloud providers include Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc. In other embodiments, hubs can also be deployed in private cloud datacenters of a virtual WAN provider that hosts hubs to establish SD-WANs for different entities.

Branch sites (e.g., multi-user compute sites), in some embodiments, are locations that have multiple user computes and/or other user-operated devices and serve as source computers and devices for communicating with other computers and devices at other sites (e.g., other branch sites, datacenter sites, etc.). The branch sites, in some embodiments, can also include servers that are not operated by users. In some embodiments, a multi-machine site is a multi-tenant datacenter, such as a Software as a Service (SaaS) provider's datacenter. When the multi-tenant datacenter is a SaaS provider's datacenter, in some embodiments, the forwarding elements that provide access to the multi-tenant datacenter are multi-tenant gateway routers.

The cloud gateway router 120 (also referred to herein as a cloud gateway) in some embodiments is a forwarding element that resides in a private or public datacenter. The links 140 between the cloud gateway 120 and edge routers 130, in some embodiments, are secure connection links (e.g., tunnels). In some embodiments, multiple secure connection links (e.g., multiple secure tunnels that are established over multiple physical links) can be established between one edge router and a cloud gateway.

When multiple such links are defined between an edge router and a cloud gateway, each secure connection link in some embodiments is associated with a different physical network link between the edge router and an external network. For instance, to access external networks, an edge router in some embodiments has one or more commercial broadband Internet links (e.g., a cable modem, a fiber optic link) to access the Internet, an MPLS (multiprotocol label switching) link to access external networks through an MPLS provider's network, a wireless cellular link (e.g., a 5G LTE network), etc. In some embodiments, the different physical links between an edge router 130 and the cloud gateway 120 are the same type of links (e.g., are different MPLS links).

In some embodiments, one edge router 130 can also have multiple direct links (e.g., secure connection links established through multiple physical links) to another edge router, and/or to a datacenter hub router (not shown). Again, the different links in some embodiments can use different types of physical links or the same type of physical links. Also, in some embodiments, different edge routers at different branch sites connect (1) directly through one or more links, (2) through a cloud gateway or datacenter hub router to which one of the edge routers connects through two or more links, or (3) through another edge router of another branch site that can augment its role to that of a hub forwarding element.

The cloud gateway 120 in some embodiments is used to connect two SD-WAN forwarding elements (e.g., an edge router 130 and a forwarding element located in a same datacenter as one of the applications 115) through at least two secure connection links between the gateway 120 and the two forwarding elements at the two SD-WAN sites (e.g., a branch site and a datacenter site (not shown)). In some embodiments, the cloud gateway 120 also provides network data from one multi-machine site to another multi-machine site (e.g., provides the accessible subnets of one site to another site).

In some embodiments, each secure connection link between two SD-WAN forwarding elements (i.e., the cloud gateway 120 and the edge routers 130) is formed as a VPN tunnel (e.g., an overlay tunnel) between the two forwarding elements. Also, in some embodiments, secure connection links are defined between gateways in different public cloud datacenters to allow paths through the virtual network to traverse from one public cloud datacenter to another, while no such links are defined in other embodiments. Also, in some embodiments, the cloud gateway 120 is a multi-tenant gateway that is used to define other virtual networks for other entities (e.g., other companies, organizations, etc.). Some such embodiments use tenant identifiers to create tunnels between a gateway and edge router of a particular entity, and then use tunnel identifiers of the created tunnels to allow the cloud gateway to differentiate packet flows that it receives from edge forwarding elements of one entity from packet flows that it receives along other tunnels of other entities. In other embodiments, cloud gateways are single-tenant and are specifically deployed to be used by just one entity.

The heat map 100 is generated by the management and control server, in some embodiments, based on metrics collected from the various MFEs (e.g., cloud gateway 120 and edge routers 130) of the SD-WAN. In some embodiments, the management and control server receives (or collects) metrics from a compute machine designated for collecting metrics (also referred to herein as a discoverer node (DN)) and location context associated with data message flows in the SD-WAN from MFEs of the SD-WAN. In some embodiments, the metrics collected by the DN include quality of experience (QoE) metrics, such as loss rate, packet delay rate, packet jitter rate, and throughput. The DN, in some embodiments, uses the collected QoE metrics to compute multiple QoE scores associated with the data message flows, and provides these QoE scores to the management and control server. In some embodiments, the QoE scores specify traffic densities associated with the data message flows which can be used in conjunction with the heat map to identify modifications to make to the SD-WAN. In other embodiments, the DN provides additional metrics to the management and control server in conjunction with the QoE scores.

The heat map is used, in some embodiments, to identify issues within the SD-WAN and modifications to make to the SD-WAN to mitigate the identified issues and improve forwarding through the SD-WAN. For example, in some embodiments, the heat map can be used to identify modifications to improve forwarding for points of congestion, for locations having large clusters of destinations (e.g., locations where large amounts of applications are running) without any local MFEs to forward data message flows to the clusters, for specific applications that experience above-average amounts of traffic (e.g., amounts of traffic that exceed a specified traffic threshold), and for specific applications for which certain service requirements (e.g., latency requirements) have been specified. In some embodiments, the management and control server identifies the issues and modifications to mitigate the issues (e.g., based on policies and service rules defined for the SD-WAN by a network administrator) and implements these modifications. In other embodiments, a user (e.g., network administrator) uses the visualization 100 to identify issues in the SD-WAN and define modifications for the SD-WAN through the UI.

Figure 2:
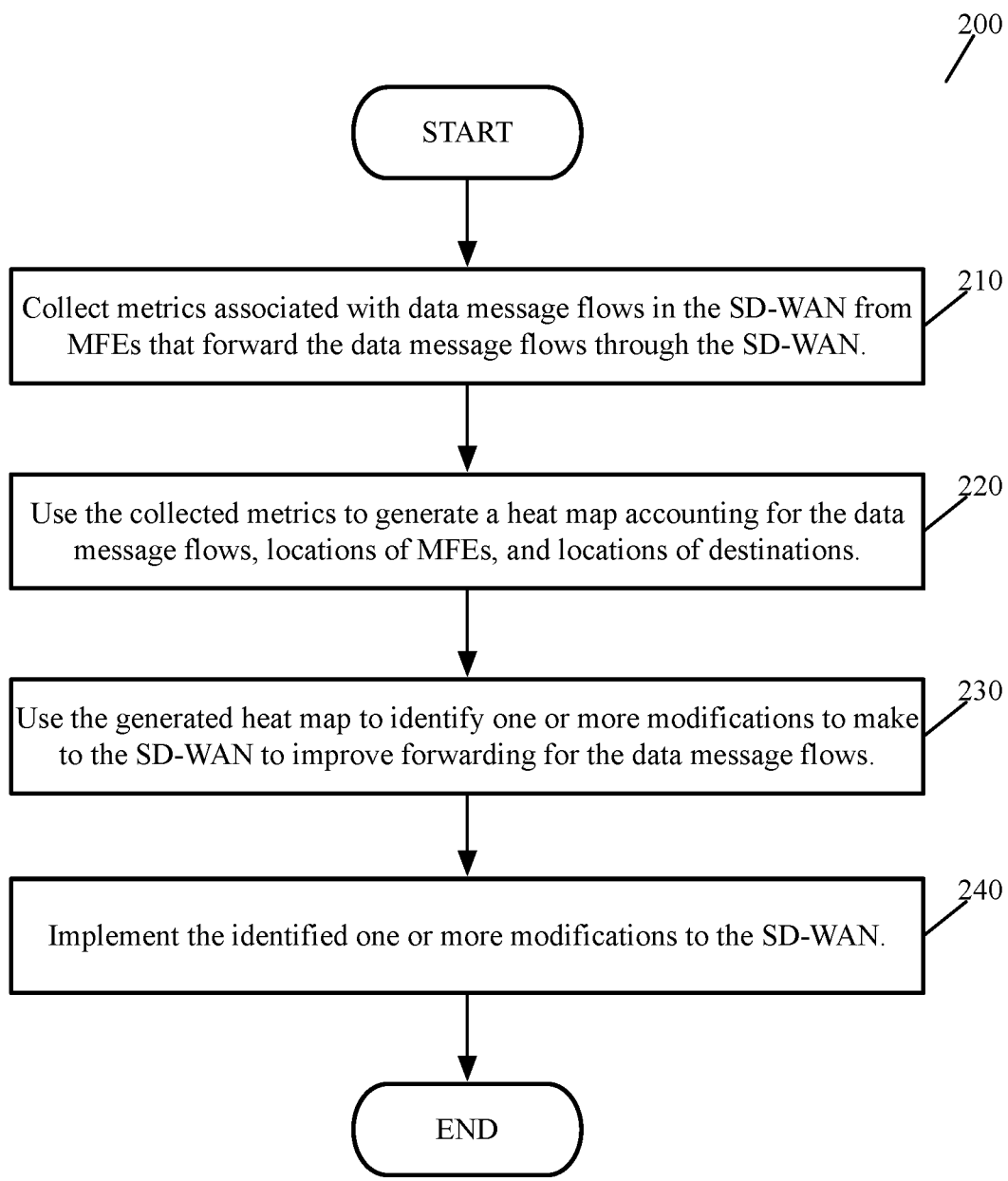
FIG. 2 conceptually illustrates a process of some embodiments for generating a heat map and using the generated heat map to identify and implement modifications.

FIG. 2, for example, conceptually illustrates a process 200 of some embodiments for generating a heat map and using the generated heat map to identify and implement modifications. In some embodiments, the process 200 is performed by a management and control server, while in other embodiments, the process 200 is performed by a combination of the management and control server and a user through a UI. The process 200 starts by collecting (at 210) metrics associated with the data message flows in the SD-WAN from MFEs that forward the data message flows through the SD-WAN.

In some embodiments, as mentioned above, the management and control server collects metrics from a DN that is designated for collected metrics from the MFEs of the SD-WAN, such as QoE metrics (e.g., packet loss rate, packet delay rate, packet jitter rate, throughput, etc.). The metrics collected from the DN, in some embodiments, include QoE scores computed by the DN. Alternatively or conjunctively, the collected metrics of some embodiments also include other scores computed by the DN, such as flow density data scores and bandwidth scores.

In some embodiments, the DN only collects metrics from cloud gateways, while in other embodiments, the DN collects metrics from all of the MFEs in the SD-WAN (i.e., cloud gateway routers, edge routers, and hub routers). For example, each cloud gateway in some embodiments is configured to profile a particular set of destinations to discover QoE for applications corresponding to the destinations and arrive at QoE metrics. The cloud gateways in some such embodiments export sets of application QoE metrics, including a list of the destinations (e.g., destination network addresses) to the DN. The management and control server of some embodiments maintains a registry of cloud providers having an appropriate cloud service availability along with associated policies. For example, VMware, Inc.'s VCO maintains a registry of cloud providers having VMware Cloud (VMC) service availability and associated policies.

The DN of some embodiments then begins probing for location context for a given destination list and arrives at a closest cloud provider having the appropriate cloud service available. In some embodiments, the DN uses established services to gather location context for the list of destinations. Examples of established services used in some embodiments include databases that provide contextual data for comprehensive IP address profiles, such as Maxmind and IPinfo.

The process 200 uses (at 220) the collected metrics to generate a heat map accounting for the data message flows, locations of MFEs, and locations of destinations. The visualization 100, for instance, includes representations of applications 115 distributed across the map 110 (i.e., destinations and locations of destinations), as well as representations of cloud gateway router 120 and edge routers 130. In addition to, or instead of, differentiating between known applications and potential applications, the representations of applications 115 in some embodiments may also be presented with varying degrees of intensity (e.g., color intensity) to differentiate between high traffic applications and low traffic applications.

The process 200 uses (at 230) the generated heat map to identify one or more modifications to make to the SD-WAN to improve forwarding for the data message flows. Examples of modifications, in some embodiments, include adding one or more cloud gateway routers or other forwarding elements (e.g., hub routers, edge routers acting as hub routers, etc.) to the SD-WAN, changing which cloud gateways and/or other forwarding elements are used to forward all or groups of certain flows, adding or changing which links are used for all or certain flows, etc.

For example, in some embodiments, a network administrator views a heat map that includes a visualization of a group of flows (e.g., file transfer flows) that are sent from the edge routers 130 and to a particular application located in Illinois via the cloud gateway router 120. Based on the heat map, and QoE metrics associated with the cloud gateway router 120 for the group of flows, the network administrator decides, in some embodiments, that one or more modifications are needed to improve forwarding for the group of flows (e.g., in order to meet a service-level agreement (SLA) associated with the group of flows).

A first potential modification that is identified to improve forwarding for the group of flows, in some embodiments, is to route the group of flows through a different next hop MFE. In some embodiments, the different next-hop MFE is a hub router (not shown) that is more geographically proximate to the particular application in Illinois than the cloud gateway router 120. In other embodiments, such as when there are no geographically proximate hub routers or other MFEs for the particular application, a new MFE (e.g., cloud gateway router) is provisioned near the particular application for forwarding the group of flows to and from the particular application.

In some embodiments, a second potential modification identified for the group of flows is to add hops to the route from the edge routers 130 to the particular application in Illinois to reduce the distance traversed between each hop. For instance, in some embodiments, an existing second MFE (e.g., a hub router (not shown) or second cloud gateway router (not shown)) is identified as a potential next-hop between the cloud gateway router 120 and the particular application to reduce the distance of the last mile connection. Alternatively, or conjunctively, in some embodiments, one or more cloud gateway routers (or other MFEs) are provisioned as additional next-hops between the cloud gateway router 120 and the particular application in Illinois to decrease the distance between each hop.

The identifications are made by the management and control server (e.g., based on policies and service rules defined for the SD-WAN) in some embodiments, and/or by a user (e.g., network administrator) through the UI provided by the management and control server. For instance, a user in some embodiments determines that a particular application or cluster of applications require their own respective cloud gateway for forwarding data message flows to and from the particular application or cluster, and subsequently provisions a cloud gateway to be deployed to a location near the particular application or cluster. In other embodiments, the management and control server determines that the number of hops between a set of source machines and a destination application should be reduced to improve QoE metrics, and generates a new forwarding rule for the flows between the set of source machines and destination application to bypass an intermediate MFE and reduce the number of hops.

The process 200 then implements (at 240) the identified one or more modifications to the SD-WAN. For instance, when a new cloud gateway is provisioned for the SD-WAN, the management and control server of some embodiments provides a set of forwarding rules defined for the new cloud gateway to edge routers of the SD-WAN to direct the edge routers to use the new cloud gateway to forward data messages according to the set of forwarding rules. In some embodiments, the set of forwarding rules may include a list of cloud gateways and, in some embodiments, specify to use the new cloud gateway for flows destined to a particular application, or, e.g., for flows destined to network addresses at a particular location or within a particular region. Following 240, the process 200 ends.

In some embodiments, the management and control server also sends out to the edge routers of the SD-WAN dynamic flow maps that include lists of destinations (e.g., IP addresses, ports, protocols, etc.) along with unique flow-group identifiers (e.g., unique universal identifiers (UUIDs)) and dynamic transit point information for dynamic transit points assigned for different flow-groups. The dynamic transit points, of some embodiments, are cloud gateways that forward data message flows through the SD-WAN. In some embodiments, each cloud gateway that is a dynamic transit point is registered with the management and control server as a dynamic transit gateway.

Each flow group, in some embodiments, is defined based on location-discovery performed by the DN and are identified by flow group identifiers, which are assigned to corresponding dynamic transit identifiers, in some embodiments. Also, in some embodiments, flow groups are defined based on one or more attributes associated with each flow in the flow group. In some embodiments, examples of such attributes include one or more of a destination address or set of destination addresses of the flows, a source address or set of source addresses of the flows, a certain category associated with the flows (e.g., VOIP (voice over IP), video conference, file transfer, etc.), etc.

Different flow groups are defined according to different attributes in some embodiments. For example, in some embodiments, a first flow group is defined based on layer 7 (L7) information, such as an application identifier (appID) that identifies the type of data (e.g., video, VOIP, etc.) contained in the payloads of the packets of the flows in the flow group, while a second flow group is defined based on L7 or contextual attributes (i.e., attributes other than L2-L4 header values) that identify a set of source applications from which the flows emanate (e.g., a particular video conference application or video streaming service application). To obtain such L7 attributes, some embodiments perform deep packet inspection at the edge devices, as further described below. Conjunctively, or alternatively, to using L7 attributes, some embodiments also define flow groups based on other L2-L4 header values and/or other non-L2 to L4 contextual attributes associated with the flows in the flow group.

The dynamic flow maps, in some embodiments, are each defined and formatted according to a five-tuple identifier corresponding to a particular destination, a flow group identifier assigned to a group of flows destined for the particular destination, and an identifier associated with a dynamic transit point through which the particular destination can be reached. The edge devices of some embodiments use software-defined routing to leverage the dynamic flow maps and forward application traffic toward the best available cloud gateway.

Each of the edge routers, in some embodiments, processes the received dynamic flow maps and installs special aggregated routes based on the flow-group UUIDs that are uniquely associated with dynamic transit gateway identifiers as next-hop logical identifiers. As flows are received at the edge devices, each edge device performs a flow-map check, in some embodiments, and identifies a flow group associated with a received flow. For example, in some embodiments, each edge device collects attributes from received packets and uses the collected attributes to perform the flow-map check to identify the associated flow group. As described above, each flow group is defined, in some embodiments, based on one or more attributes, and as such, each edge device of some embodiments collects attributes from each received packet to identify the flow group associated with the packet. In some embodiments, each edge device includes a deep packet inspector for performing deep packet inspection (DPI) on received packets to extract and collect contextual attributes (e.g., L7 attributes) for use in performing the flow-map check.

In some embodiments, once an edge device has identified a flow group corresponding to the received packet, and the UUID associated with the identified flow group, the edge device performs a special aggregated route lookup action to identify a route based on the UUID associated with the identified flow group. The edge device of some embodiments then uses a logical identifier of the dynamic transit gateway corresponding to the flow group UUID to route the received flow (e.g., by sending the traffic on an overlay tunnel associated with the dynamic transit gateway), according to some embodiments.

Figure 3:
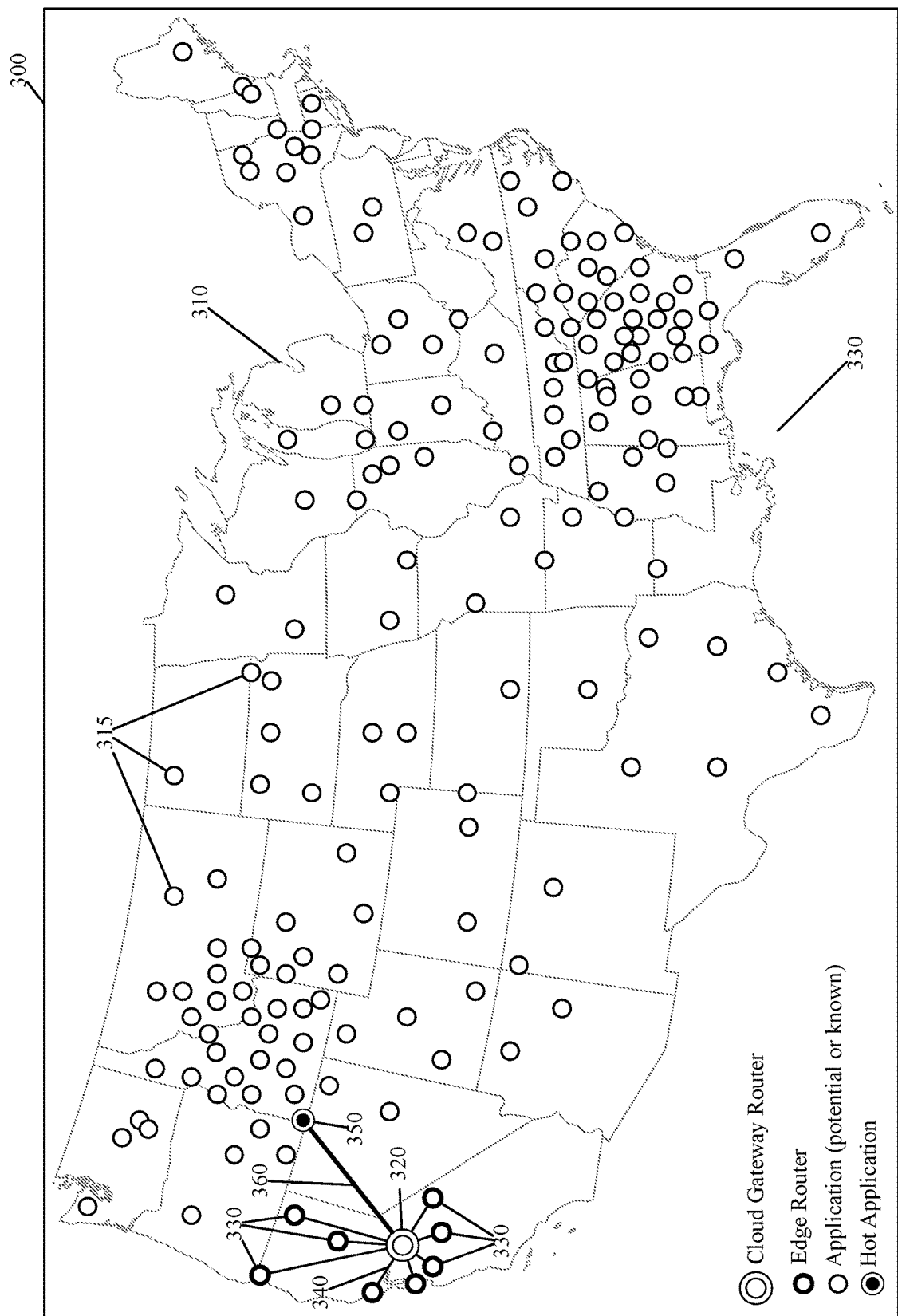
FIG. 3 illustrates a visualization of the heat map of some embodiments in which a hot application is identified.

FIGS. 3-9 illustrate additional example visualizations of a heat map for an SD-WAN, in some embodiments. FIG. 3 illustrates a visualization 300 of the heat map in which a hot application 350 is identified. Hot applications, in some embodiments, are applications that receive higher than threshold amounts of traffic. Also, in some embodiments, hot applications can include applications of a particular category (e.g., video conference applications). Moreover, the heat map might display a hot region, which is a region that has a large number of other applications (e.g., a dense application cluster). Like the visualization 100, the visualization 300 includes a map 310 of the geographic area spanned by the SD-WAN, representations of applications 315 distributed across the map 310, a cloud gateway 320, and multiple edge routers 330 connected to the cloud gateway 320 by links 340.

As shown, the cloud gateway 320 connects the edge routers 330 to at least the hot application 350 via one or more links 360. While illustrated as a direct link between the cloud gateway 320 and the hot application 350, the one or more links 360 connect the cloud gateway 320 to, e.g., an edge router for a datacenter hosting a server that runs the hot application 350, according to some embodiments. In this example, the hot application 350 is a SaaS application hosted by a third-party datacenter (not shown) and the links 360 are unmanaged links. In other embodiments, the hot application 350 is an SD-WAN application that runs on a server belonging to the entity for which the SD-WAN is implemented and the links 360 are managed links.

Figure 4:
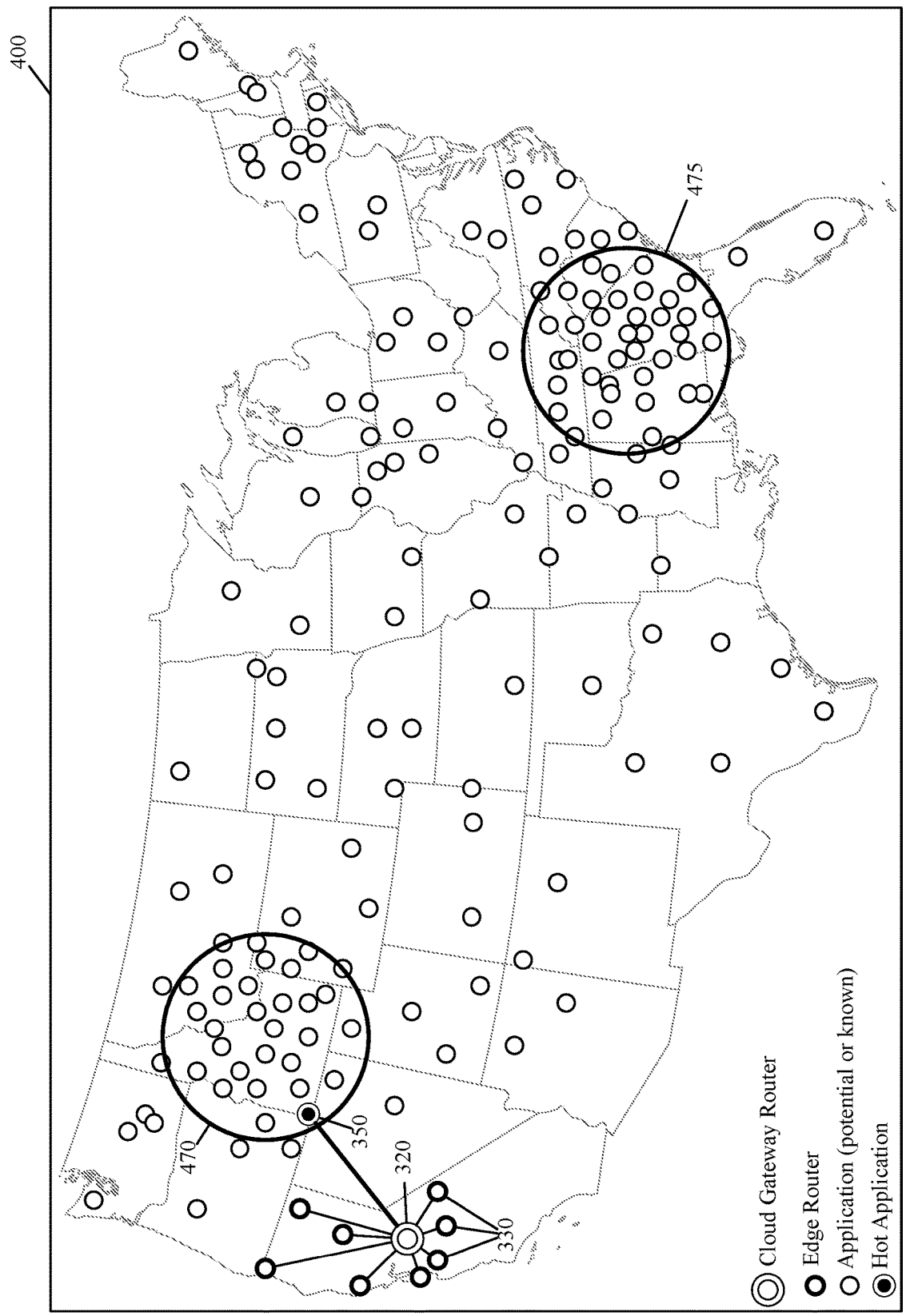
FIG. 4 illustrates a visualization of some embodiments in which destination clusters (i.e., groups of geographically proximate applications) have been identified.

FIG. 4 illustrates a visualization 400 in which destination clusters (i.e., groups of geographically proximate applications) have been identified. The location context (e.g., location context gathered by the DN described above) is used, in some embodiments, to identify larger groups of destinations (e.g., using methods like clustering). As shown, two destination clusters 470 and 475 have been identified, with the hot application 350 located within the destination cluster 470. The center points (centroids) of the destination clusters 470 and 475, in some embodiments, are identified and marked using algorithms, such as Gaussian Mixture Methods (GMM), or using local density estimators, such as DBSCAN. While two clusters are identified in the visualization 400, other embodiments may include additional or fewer destination clusters than illustrated.

In some embodiments, an application may be relocated, while maintaining the same destination network address. The application is relocated, in some embodiments, when a server machine (e.g., a virtual machine (VM) or Pod) on which the application executes is migrated to a new location. In other embodiments, a new server machine is deployed at the new location and configured like the prior server machine on which the application executed. To relocate the application to the server machine at the new location, a new instance of the application is deployed to the new server machine, in some embodiments, and configured in the same way as the previous instance of the application.

Figure 5:
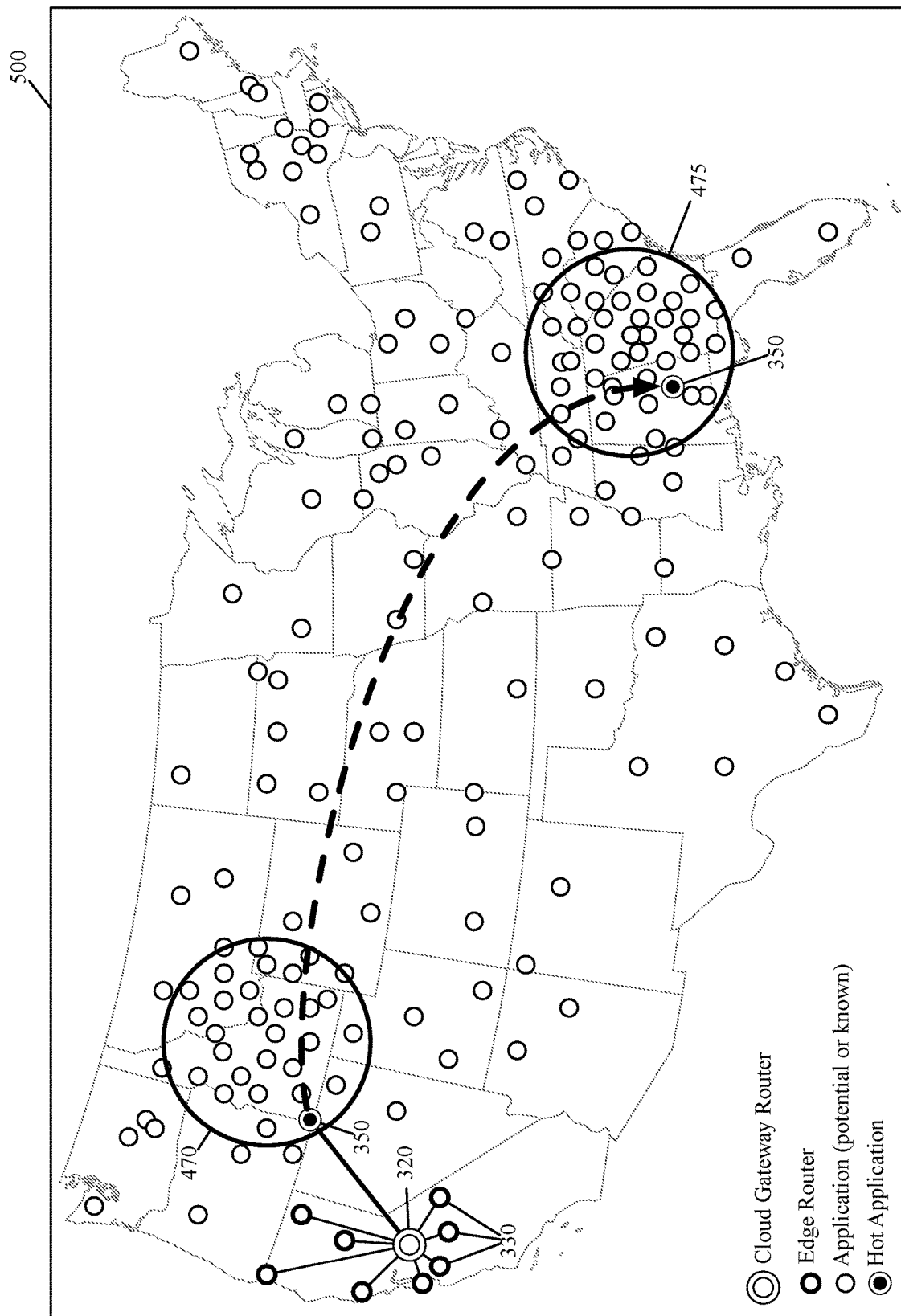
FIG. 5 illustrates a visualization of some embodiments in which the hot application is relocated from its initial location within a first destination cluster to a location within a second destination cluster.

For instance, FIG. 5 illustrates a visualization 500 in which the hot application 350 is relocated from its initial location within the destination cluster 470 to a location within the other destination cluster 475. As shown, the cluster 470 is much more geographically proximate to the cloud gateway 320 than the cluster 475. However, the edge routers 330 are still configured to forward data messages to the hot application 350 using the cloud gateway 320. As a result, data message flows sent between the cloud gateway 320 and the hot application 350 have a longer distance to travel before reaching their destination.

Figure 6:
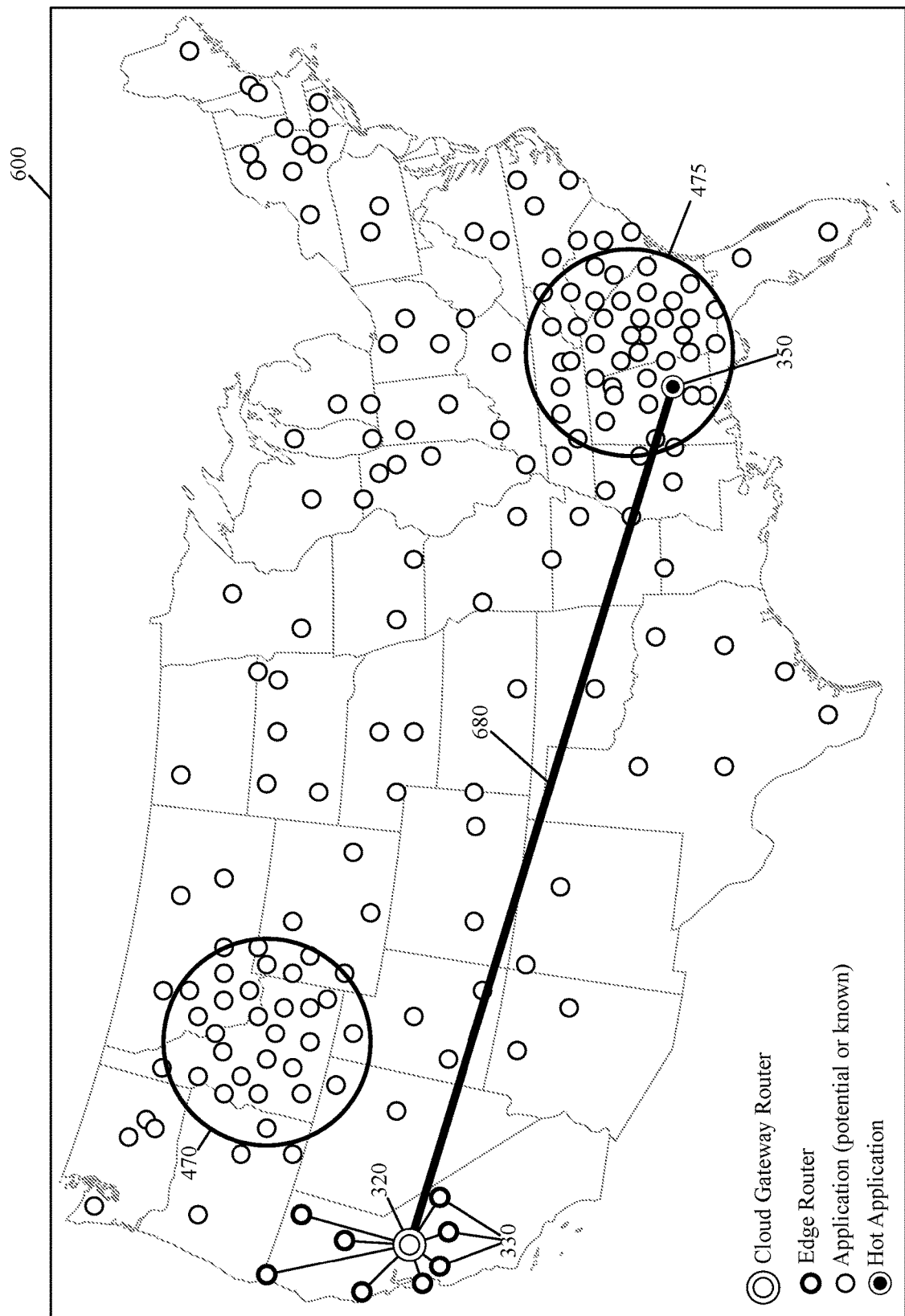
FIG. 6 illustrates the visualization of some embodiments after the hot application has been relocated to a location within the second destination cluster.

FIG. 6, for example, illustrates the visualization 600 after the hot application 350 has been relocated to a location within the destination cluster 475. The last mile connectivity 680 from the cloud gateway 320 to the hot application 350 at its new location covers a much longer distance than the last mile connectivity (i.e., links 360) before the hot application 350 was relocated. Due to the increased distance, some embodiments experience networking issues that affect QoE for users, such as increased latency. As such, some embodiments use the heat map to identify potential locations for dynamic transit points (e.g., additional cloud gateways) for reaching the hot application 350, and, in some embodiments, for reaching some or all of the other applications located in and around the destination cluster 475.

In some embodiments, additional dynamic transit points are required to reach the hot application 350 based on service requirements associated with the hot application 350. Additional dynamic transit points are also required, in some embodiments, for other applications (e.g., applications that receive less than a threshold amount of traffic), as well as hot applications that have not been relocated. For example, in some embodiments an application is associated with a low latency requirement, and thus a cloud gateway that is geographically proximate to the application is required to ensure that the low latency requirement is met. In some embodiments, using the cloud gateway that is closer to the application may result in a longer round-trip time (RTT) for reaching the application compared to an RTT associated with using a cloud gateway that is farther from the application but closer to the source edge router. In some such embodiments, the longer RTT is preferable due to the lower latency of the last mile connection to the application.

Figure 7:
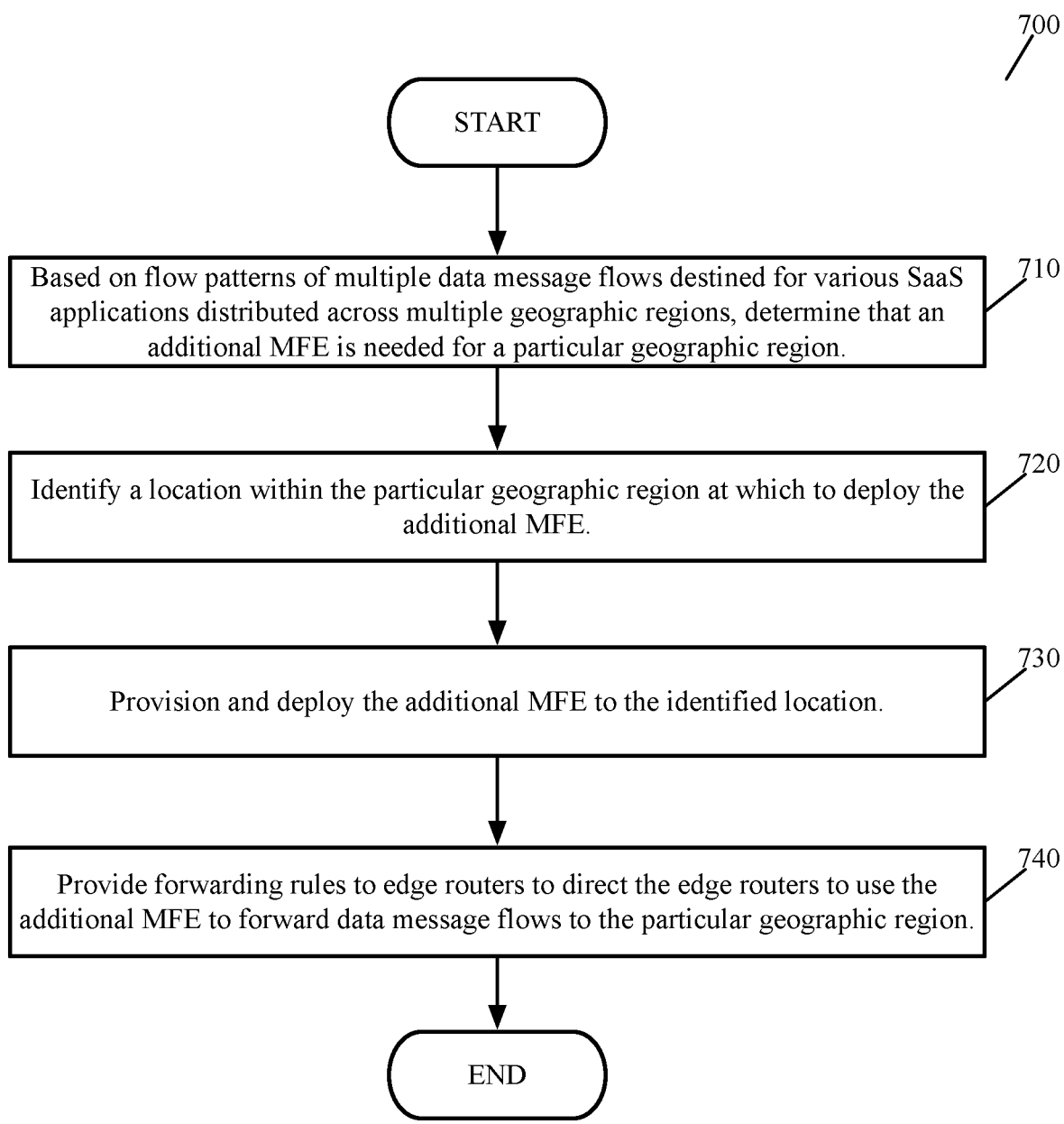
FIG. 7 conceptually illustrates a process performed in some embodiments for provisioning a new cloud gateway router for use in reaching an application or application cluster.

FIG. 7 conceptually illustrates a process 700 performed in some embodiments for provisioning a new cloud gateway router for use in reaching an application or application cluster. The application or application cluster, in some embodiments, can include applications in remote locations, such as the two applications shown within the boundaries of Minnesota in the visualizations of the map 110, as well as the destination cluster 475 before or after the application 350 is relocated. The process 700 is performed in some embodiments by a management and control server for the SD-WAN.

The process 700 starts when, based on flow patterns of multiple data message flows destined for various SaaS applications distributed across multiple geographic regions, the process determines (at 710) that an additional MFE is needed for a particular geographic region. As discussed above, after the hot application 350 is relocated, an additional dynamic transit point (e.g., cloud gateway) is needed to reach the hot application at its new location. In other embodiments, an application or application cluster may require a new cloud gateway based on a determination that there are no cloud gateways near the application or application cluster. In some such embodiments, as also mentioned above, one or more applications may be associated with service requirements that can only be met by provisioning a local cloud gateway for the application or application cluster.

Figure 8:
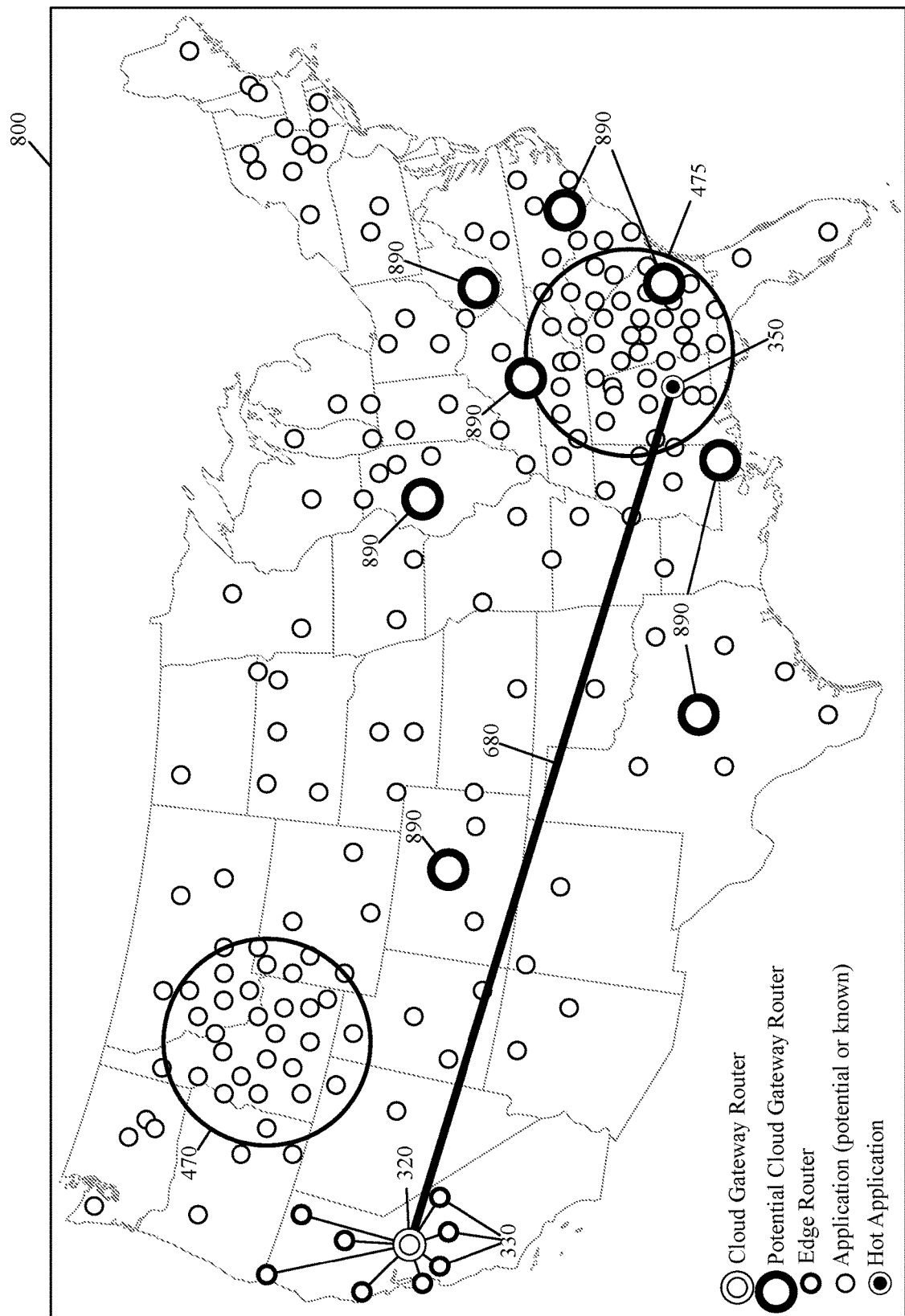
FIG. 8 illustrates a visualization of some embodiments of the heat map after potential locations for cloud gateway routers have been identified.

The process 700 identifies (at 720) a location within the particular geographic region at which to deploy the additional MFE. FIG. 8, for instance, illustrates a visualization 800 of the heat map after potential locations for cloud gateway routers have been identified. As shown, eight (8) potential locations for cloud gateway routers 890 (i.e., dynamic transit points) have been identified and presented on the heat map.

In some embodiments, proximity scoping is utilized by the cloud gateway 320 or the management and control server for the SD-WAN to identify the potential locations for dynamic transit points. Tools such as MyTraceroute (MTR) are used, in some embodiments, to trace lossy network segments and find the potential locations. Capacitated P-center algorithms are also employed, in some embodiments, to identify optimal locations for such dynamic transit points. In some embodiments, centroids with lossy network segments are added to the destination clusters 470 and 475. Also, in some embodiments, available edge-compute stacks (i.e., existing MFE instances) that are close to the identified potential locations are added to a set of edge-compute stacks. The management and control server of some embodiments selects a location from the identified potential locations based on QoE scores associated with the locations.

The process 700 then provisions and deploys (at 730) the additional MFE to the identified location. The management and control server of some embodiments registers with a controller service in a cloud provider that is in proximity with SaaS applications in the identified location. In some embodiments, the steps to allocate transit points are as follows. First, identified centroids of application clusters (e.g., destination clusters 470 and 475) are added to a set, $C_k$, where C represents the set of clusters and k represents the number of identified clusters. For $C_k$, a set of transit points, $T_m$, closest to the clusters is selected, where T is the set of transit points and m is the number of selected transit points (i.e., a number of transit points in a set of M transit points). Optimal transit points are then located by applying the capacitated P-center method as mentioned above, and then assigned to edge routers given $E_n$, wherein E is the set of edges and n is the number of edges in a set of N edges, $x_{n,m,k}$ is the estimated utilization (i.e., load) of accessing $C_k$ via $T_m$ from $E_n$, $L_m$ is the maximum load of $T_m$, $l_m$ is the current load of m, and $Q_n$ is the maximum number of transit points that can be assigned to an edge router n.

Using the above, the objective is to determine maximum utilization and allocation of transit points, $W=\Sigma n\Sigma m\Sigma k\ x_{n,m,k}*X_{n,m}+\Sigma m\ l_m Y_m$, where: $X_{n,m}$ is 1 if m is selected for n, or 0 otherwise; and $Y_m$ is 1 if m is deployed, or 0 otherwise. This objective is subject to a set of caveats. For instance, the total assigned transit points cannot exceed the maximum transit points M, the sum of the estimated total load and current load of a transit point cannot exceed the maximum load of trans point $L_m$, and the number of transit points assigned to an edge n cannot exceed the maximum allowed number of transit points per edge $Q_n$. Additionally, the specified integrality constraints include $X_{m,n}$ is equal to 0,1 for any/all m,n; and $Y_m$ is equal to 0,1 for any/all m.

In some embodiments, the management and control server provisions gateways by triggering a gateway template-based auto-provisioning and activating the gateway instances. The template-based auto-provisioning, in some embodiments, is API-based and provides an automated solution for hosting gateways on target cloud providers (e.g., AWS, GCP, Microsoft Azure, etc.). Once the gateway has been provisioned, the gateway is registered with the management and control server as a dynamic transit gateway, in some embodiments. The management and control server of some embodiments receives metrics (e.g., QoE scores) associated with provisioned dynamic transit gateways and compares these metrics with metrics received before the dynamic transit gateways were provisioned in order to identify improvements. In some embodiments, the management and control server performs auto-scaling out and decommissioning of dynamic transit gateways (e.g., when flow densities fall below established thresholds).

Once the additional MFE has been provisioned and deployed, the process 700 provides (at 740) forwarding rules to edge routers to direct the edge routers to use the additional MFE to forward data message flows to the particular geographic region. In some embodiments, the forwarding rules may specify a particular application or set of applications for which the additional MFE is to be utilized, while all other data message flows to other applications not specified by the rules are to be forwarded using, e.g., a default MFE, even when the other applications are in the same region as the specified particular application or set of applications.

Figure 9:
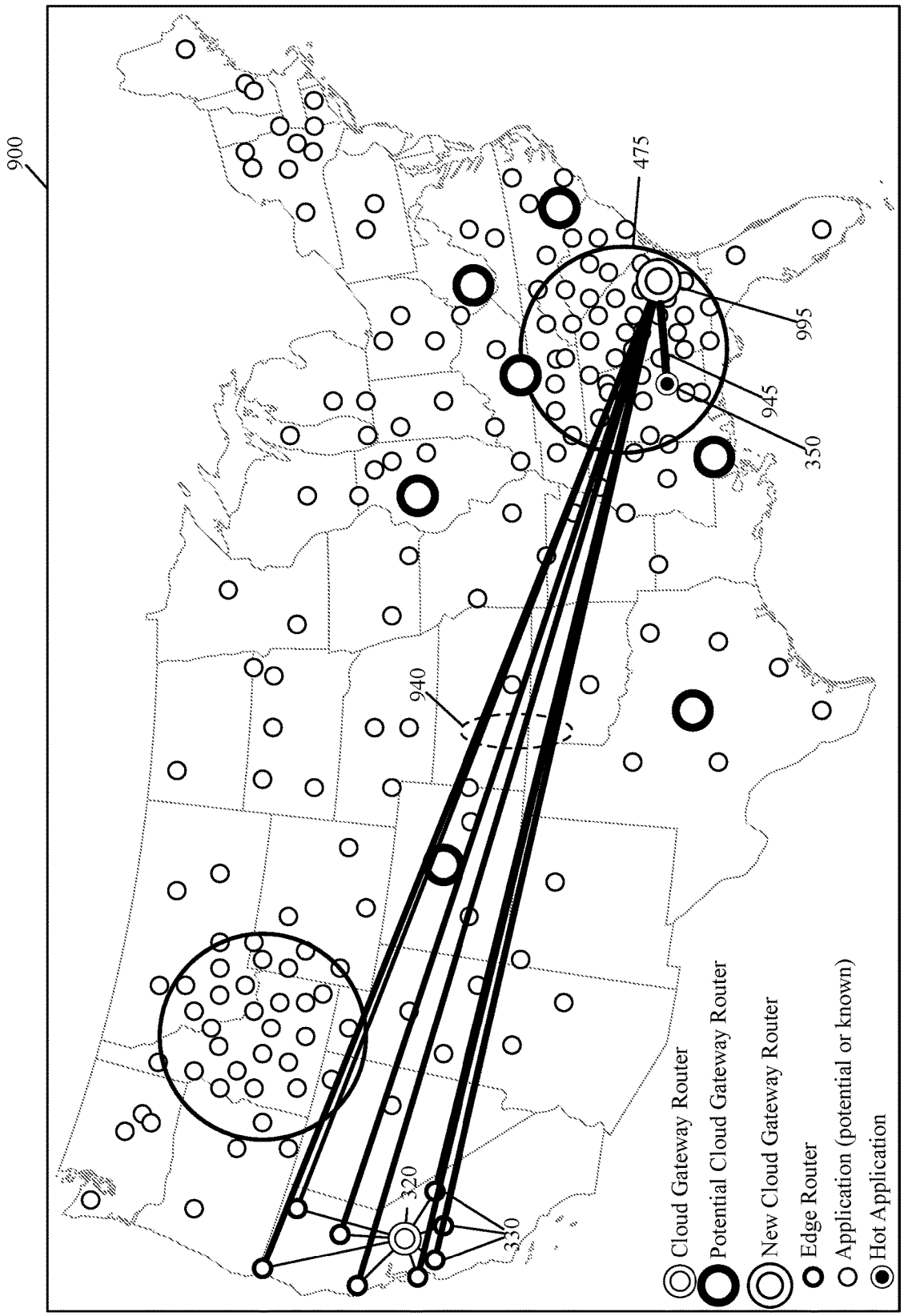
FIG. 9 illustrates a visualization of some embodiments in which a particular location for new cloud gateway has been selected for the edge routers to use to reach the hot application at its new location.

FIG. 9 illustrates a visualization 900 in which a particular location for new cloud gateway 995 has been selected for the edge routers to use to reach the hot application at its new location. As shown, the edge routers 330 have connections 940 to the new cloud gateway 995, which has a significantly shorter last mile connection 945 to the hot application 350. In some embodiments, after deploying the new cloud gateway 995, the management and control server provides forwarding rules to the edge routers to direct the edge routers to use the new cloud gateway 995 for all flows to applications in and around the cluster 475. In other embodiments, the management and control server provides forwarding rules to direct the edge routers to use the new cloud gateway 995 only for flows destined for the hot application 350, and to use the existing cloud gateway 320 for each other flow to the region.

In some of these embodiments, the management and control server also provides new forwarding rules, records, and/or configuration data to the new cloud gateway 995 to direct the new cloud gateway 995 to properly forward flows (e.g., a list of service IP addresses for the service applications, data for setting up tunnels to the computers and/or machines on which the applications execute or to their associated forwarding elements, etc.) received from the edge routers 330 to applications that are running in datacenters in Georgia and one or more neighboring states (e.g., applications in and around the destination cluster 475). Returning to the process 700, following 740, the process ends.

In some embodiments, the DN continues to compute QoE scores from QoE metrics collected from MFEs of the SD-WAN after modifications to the SD-WAN have been made. From the DN, the management and control server collects the computed QoE scores and, in some embodiments, compares these scores against previously collected QoE scores to identify and highlight improvements resulting from the SD-WAN modification(s). In some embodiments, dynamic transit gateways are monitored and, when flow densities drop below established threshold values, in some embodiments, the dynamic transit gateways are auto-scaled and decommissioned.

In several embodiments described above, a new cloud gateway is deployed in a region for reaching a hot application that is relocated to the region (e.g., the cloud gateway 995 that is deployed for reaching the hot application 350 that is relocated from destination cluster 470 to destination cluster 475). In some embodiments, a network administrator can use a heat map to deploy a new cloud gateway even when no applications have relocated, e.g., to deploy the new cloud gateway in a region for applications that currently operate in that region or nearby regions. The following two examples are illustrative of such a use of a heat map.

As a first example, a network administrator of some embodiments views a heat map to identify destination clusters in one region (e.g., destination cluster 475 in the south) being accessed by computing devices in SD-WAN connected sites in another region (e.g., by machines connected to the edge routers 330 in California) through a cloud gateway that is deployed in the other region near the computing devices (e.g., the cloud gateway 320 in California). After noticing this, the network administrator of some embodiments can then decide to deploy a cloud gateway (e.g., a cloud gateway 995 in Georgia) closer to the destination cluster to decrease the distance of the last mile connection to the destination cluster.

Another example involves a network administrator viewing the heat map to identify hot applications located in sparsely, or relatively sparsely, server populated regions (e.g., the two applications located within the bounds of Minnesota on the map 110) that are being frequently accessed by computing devices in SD-WAN connected sites located in other regions (e.g., the machines connected to the edge routers 330 in California) through a cloud gateway located in said other regions (e.g., the cloud gateway 320 in California). After viewing the heat map and identifying such hot applications, the network administrator can decide to deploy a cloud gateway (e.g., a cloud gateway in a public or private cloud datacenter in Minnesota) closer to the identified hot applications so that there is at least one geographically proximate cloud gateway for reaching the hot applications in order to shorten the last mile connectivity to the hot applications.

Additionally, while the embodiments described above provide examples in which a single cloud gateway router is provisioned to improve forwarding, in other embodiments, two or more cloud gateway routers are provisioned to improve forwarding. For example, in some such other embodiments, a first cloud gateway router is provisioned for forwarding flows identified as hot flows, while a second cloud gateway router is provisioned for forwarding all other flows for a particular region. In still other embodiments, one or more additional cloud gateway routers are provisioned to, e.g., decrease the load for an existing cloud gateway router that forwards flows to and from, e.g., a dense destination cluster.

Figure 10:
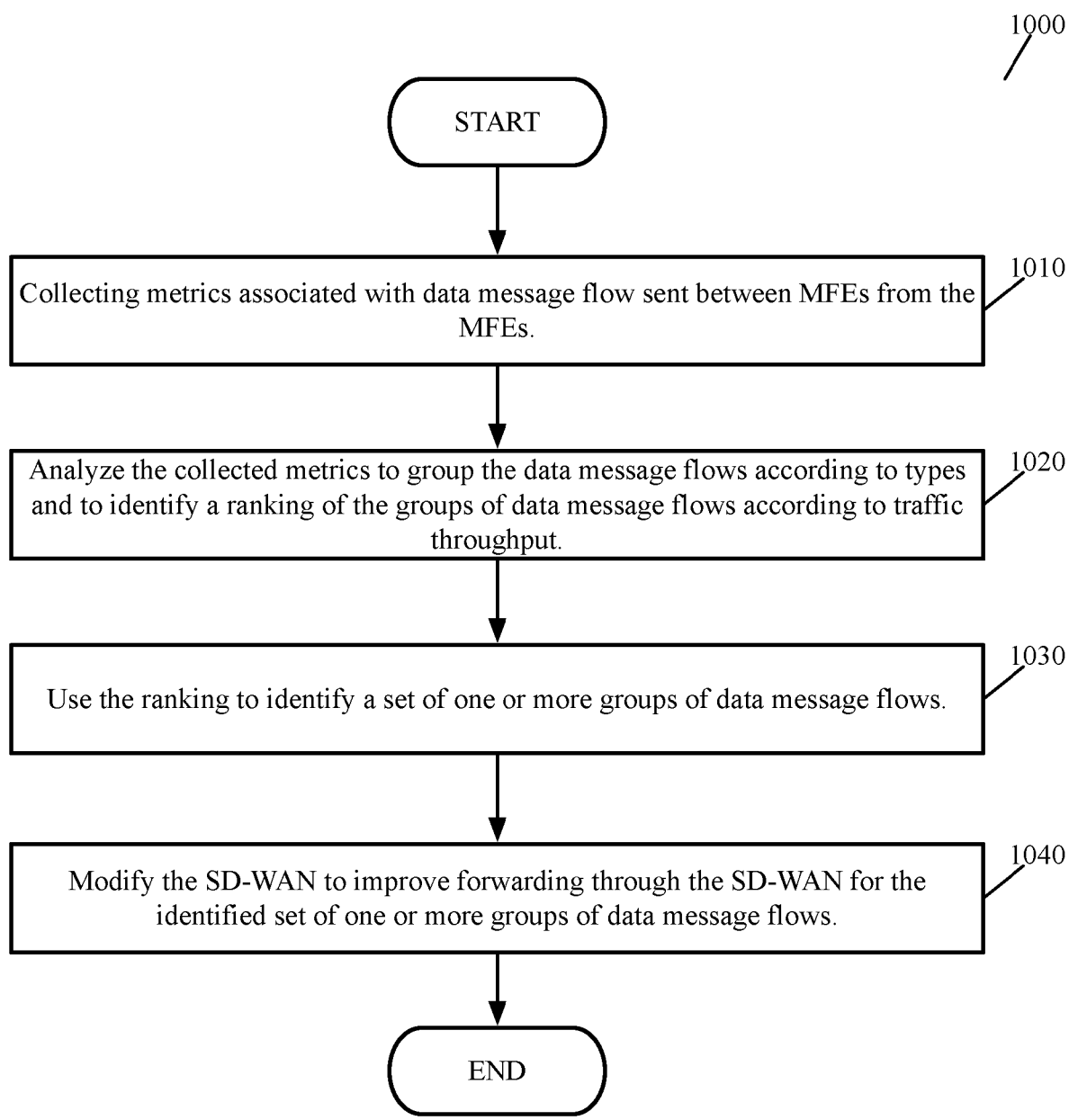
FIG. 10 conceptually illustrates a process performed in some embodiments to modify the SD-WAN to improve forwarding for one or more flows determined to be hot flows (e.g., flows destined for hot applications).

FIG. 10 conceptually illustrates a process 1000 performed in some embodiments to modify the SD-WAN to improve forwarding for one or more flows determined to be hot flows (e.g., flows destined for hot applications). The process 1000 is performed in some embodiments by the management and control server for the SD-WAN. The process 1000 starts when the management and control server collects (at 1010) metrics associated with data message flows sent between MFEs from the MFEs. As discussed above, the management and control server of some embodiments collects QoE metrics from a DN that is designated for collected metrics from the MFEs of the SD-WAN. In some embodiments, each cloud gateway is configured to profile a particular set of destinations to discover QoE for applications corresponding to the destinations and arrive at QoE metrics, which are then collected by (or exported to) the DN.

The process 1000 analyzes (at 1020) the collected metrics to group the data message flows according to types and to identify a ranking of the groups of data message flows according to traffic throughput. In some embodiments, data message flows with high packet rate are defined as hot flows. The hot flows, in some embodiments, also include flows destined for hot applications, and/or include flows from a particular hot source or set of sources that send a lot of packets. In still other embodiments, hot flows include flows belonging to a certain category (e.g., video conference flows, VOIP flows, etc.). In yet other embodiments, hot flows are defined as all, or any combination of, the aforementioned hot flows.

The process 1000 uses (at 1030) the ranking to identify a set of one or more groups of data message flows. For instance, the ranking may group flows based on maximum and minimum thresholds for throughput (i.e., packet rate), and identify the top N groups to include in the set of one or more groups of data message flows. In some embodiments, the identified set of one or more groups will be designated as the hot flows for which modifications to the SD-WAN will be made.

Figure 11:
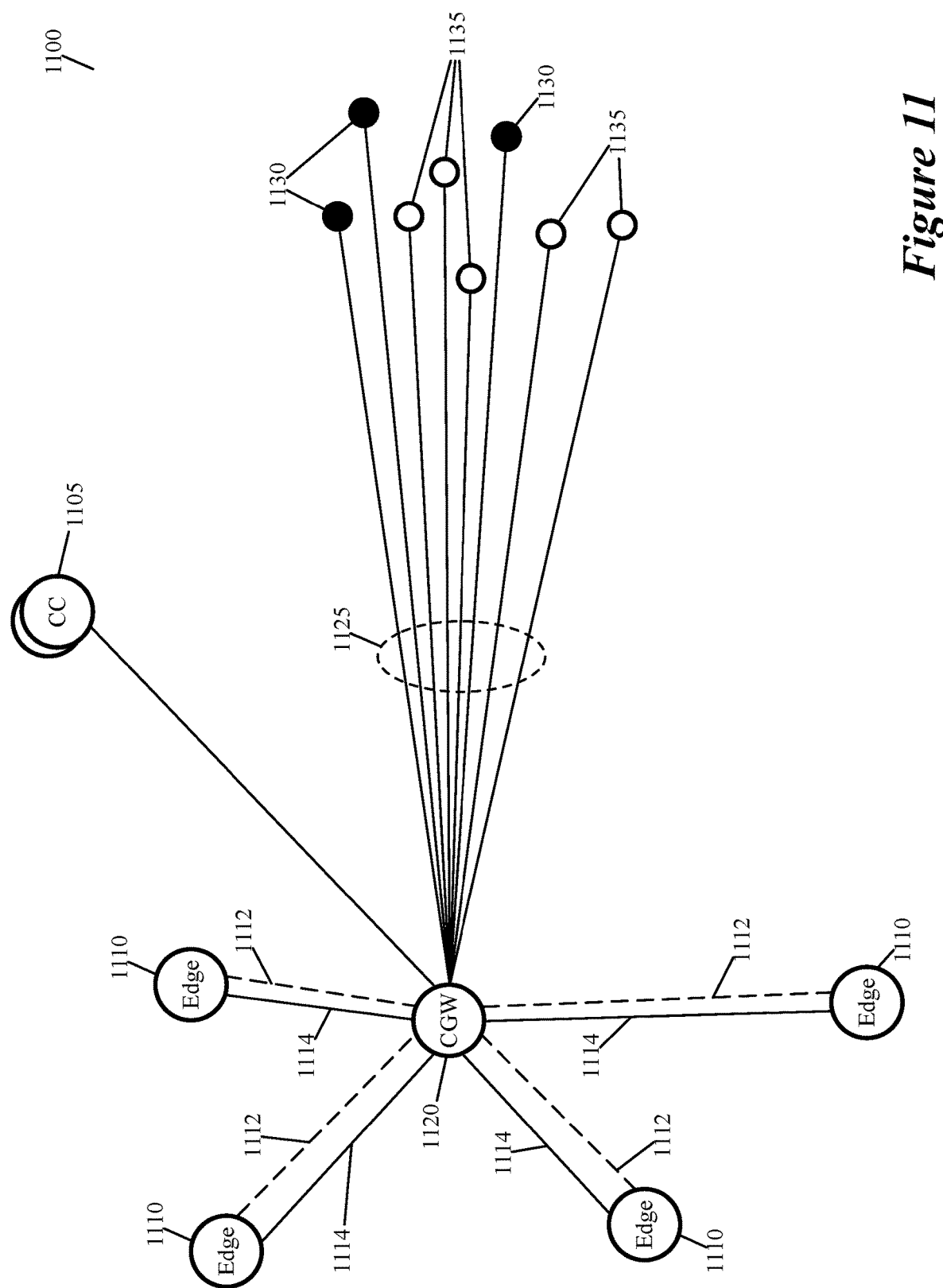
FIG. 11 conceptually illustrates a diagram showing a cloud gateway that provides connections for a set of edge routers to a set of applications.

Ranking flows based on their "hotness" will now be described by reference to FIG. 11, which conceptually illustrates a diagram 1100 showing a cloud gateway that provides connections for a set of edge routers to a set of applications. Each of the edge routers 1110 respectively includes two secure connection links 1112 and 1114 to connect to the cloud gateway router 1120. The links 1112 are commercial broadband Internet links (e.g., a cable modem, a fiber optic link), while the links 1114 are optimized MPLS (multiprotocol label switching) links. In some embodiments, each link 1112 and 1114 includes multiple links. The cloud gateway router 1120 connects to the applications 1130 and 1135 via links 1125. The links 1125 are managed links in some embodiments, unmanaged links in other embodiments, and a combination of managed and unmanaged links in still other embodiments.

In this example, the applications 1130 are ranked and defined as hot applications (e.g., applications that receive more than a threshold amount of traffic) while the applications 1135 are applications that experience average amounts of traffic (e.g., applications that receive less than a threshold amount of traffic). As such, the flows that are destined to the hot applications 1130 will be hot flows that will have higher rankings (at 1030) while the flows that are destined to the non-hot applications 1135 will be non-hot flows that will have lower rankings (at 1030).

Returning to the process 1000, the process modifies (at 1040) the SD-WAN to improve forwarding through the SD-WAN for the identified set of one or more groups of data message flows. For instance, in the diagram 1100, in some embodiments, based on metrics collected from the cloud gateway 1120, the controller cluster 1105 provides new or updated forwarding rules to the cloud gateway for distribution to the edge routers 1110 to direct the edge routers 1110 to use the links 1112 when forwarding data message flows associated with the non-hot applications 1135, and to use the links 1114 when forwarding data message flows associated with the hot applications 1130 (i.e., the set of hot flows). In other embodiments, other modifications to the SD-WAN are implemented to improve forwarding for the hot flows, such as adding links (e.g., adding fiber links) between the edge routers and cloud gateway, deploying one or more additional cloud gateways designated for forwarding hot flows, etc. Following 1040, the process 1000 ends.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
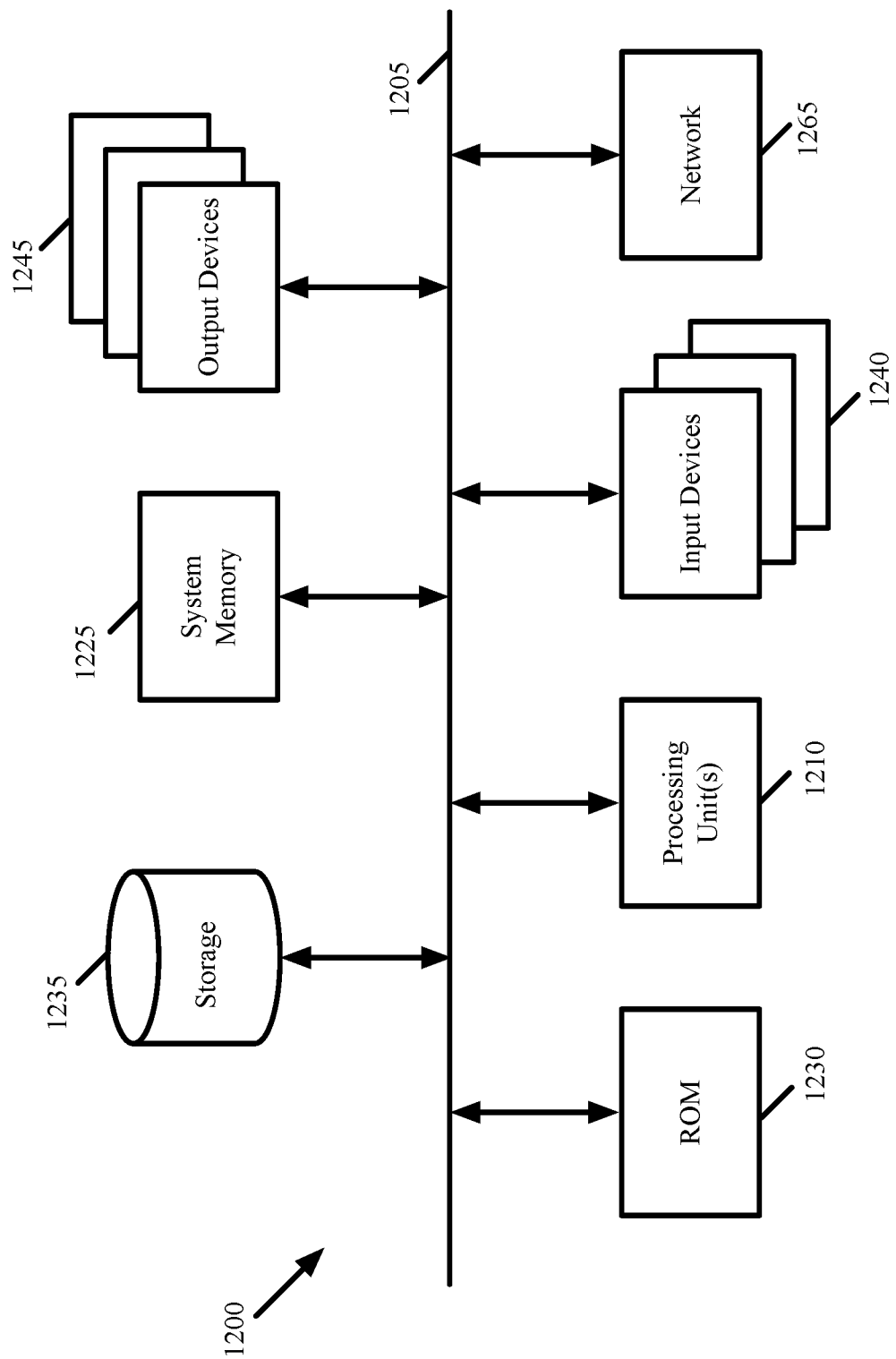
FIG. 12 conceptually illustrates a computer system with which some embodiments of the invention are implemented.

FIG. 12 conceptually illustrates a computer system 1200 with which some embodiments of the invention are implemented. The computer system 1200 can be used to implement any of the above-described hosts, controllers, gateway, and edge forwarding elements. As such, it can be used to execute any of the above described processes. This computer system 1200 includes various types of non-transitory machine-readable media and interfaces for various other types of machine-readable media. Computer system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) 1210 may be a single processor or a multi-core processor in different embodiments. The read-only-memory (ROM) 1230 stores static data and instructions that are needed by the processing unit(s) 1210 and other modules of the computer system 1200. The permanent storage device 1235, on the other hand, is a read-and-write memory device. This device 1235 is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory 1225 is a volatile read-and-write memory, such as random access memory. The system memory 1225 stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices 1240 enable the user to communicate information and select commands to the computer system 1200. The input devices 1240 include alphanumeric keyboards and pointing devices (also called "cursor control devices"). The output devices 1245 display images generated by the computer system 1200. The output devices 1245 include printers and display devices, such as cathode ray tubes (CRT) or liquid crystal displays (LCD). Some embodiments include devices such as touchscreens that function as both input and output devices 1240 and 1245.

Finally, as shown in FIG. 12, bus 1205 also couples computer system 1200 to a network 1265 through a network adapter (not shown). In this manner, the computer 1200 can be a part of a network of computers (such as a local area network ("LAN"), a wide area network ("WAN"), or an Intranet), or a network of networks (such as the Internet). Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for modifying an SD-WAN (software-defined wide-area network), the method comprising:
    collecting, from a set of managed forwarding elements (MFEs), a plurality of metrics associated with a plurality of data message flows sent between the set of MFEs;
    analyzing the collected plurality of metrics to group the data message flows according to a plurality of types and to identify a ranking of the plurality of groups of data message flows according to traffic throughput;
    using the ranking to identify a set of one or more groups of data message flows; and
    modifying the SD-WAN to improve forwarding through the SD-WAN for the identified set of one or more groups of data message flows;
    wherein the at least one data message flow in the set of one or more groups of data message flows is associated with a destination network address assigned to an application hosted in a datacenter in a geographic region, wherein modifying the SD-WAN to improve forwarding for the identified set of one or more groups of data message flows comprises deploying a first MFE to the geographic region to improve forwarding to and from the application, the at least one data message flow destined for the application is one of a plurality of data message flows associated with destination network addresses located in the particular geographic region, the second MFE forwards data messages belonging to the at least one data message flow destined for the application; and a first message flow in the plurality of data messages flows associated with destination network addresses located in the geographic region is forwarded to and from the destination network addresses by a second MFEs in the set of MFEs.

2. The method of claim 1, wherein collecting, from the set of MFEs, the plurality of metrics associated with the plurality of data message flows sent between the set of MFEs comprises collecting a plurality of quality of experience (QoE) scores associated with a plurality of SaaS applications from a particular compute machine (i) that collects QoE metrics from the set of MFEs and (ii) that uses the collected QoE metrics to compute the plurality of QoE scores.

3. The method of claim 2, wherein the QoE metrics comprise at least packet loss rate, packet delay rate, packet jitter rate, and throughput.

4. The method of claim 2, wherein the plurality of QoE scores specify traffic throughput associated with the plurality of flows, wherein analyzing the collected plurality of metrics to rank the plurality of data message flows according to traffic throughput comprises identifying the specified traffic throughputs from the plurality of QoE scores.

5. The method of claim 1, wherein the additional MFE forwards data messages belonging only to the at least one data message flow destined for the particular SaaS application based on a first set of forwarding rules specifying the additional MFE as a next hop for reaching the destination network address assigned to the particular SaaS application.

6. The method of claim 5, wherein a second set of forwarding rules specifies the one or more existing MFEs in the set of MFEs as next hops for reaching other destination network addresses located in the particular geographic region.

7. The method of claim 1, wherein modifying the SD-WAN to improve forwarding through the SD-WAN for the identified set of one or more groups of data message flows comprises increasing capacities for a set of managed links across which data messages belonging to the identified set of one or more groups of data message flows are forwarded.

8. The method of claim 1, wherein the identified set of one or more groups of data message flows are specified as hot flows.

9. A non-transitory machine readable medium storing a program for execution by a set of processing units, the program for modifying an SD-WAN (software-defined wide-area network), the program comprising sets of instructions for:
    collecting, from a set of managed forwarding elements (MFEs), a plurality of metrics associated with a plurality of data message flows sent between the set of MFEs;
    analyzing the collected plurality of metrics to group the data message flows according to a plurality of types and to identify a ranking of the plurality of groups of data message flows according to traffic throughput;
    using the ranking to identify a set of one or more groups of data message flows; and
    modifying the SD-WAN to improve forwarding through the SD-WAN for the identified set of one or more groups of data message flows;
    wherein the at least one data message flow in the set of one or more groups of data message flows is associated with a destination network address assigned to an application hosted in a datacenter in a geographic region, wherein modifying the SD-WAN to improve forwarding for the identified set of one or more groups of data message flows comprises deploying a first MFE to the geographic region to improve forwarding to and from the application, the at least one data message flow destined for the application is one of a plurality of data message flows associated with destination network addresses located in the particular geographic region, the second MFE forwards data messages belonging to the at least one data message flow destined for the application; and a first message flow in the plurality of data messages flows associated with destination network addresses located in the geographic region is forwarded to and from the destination network addresses by a second MFEs in the set of MFEs.

10. The non-transitory machine readable medium of claim 9, wherein the set of instructions for collecting, from the set of MFEs, the plurality of metrics associated with the plurality of data message flows sent between the set of MFEs comprises a set of instructions for collecting a plurality of quality of experience (QoE) scores associated with a plurality of SaaS applications from a particular compute machine (i) that collects QoE metrics from the set of MFEs and (ii) that uses the collected QoE metrics to compute the plurality of QoE scores.

11. The non-transitory machine readable medium of claim 10, wherein the QoE metrics comprise at least packet loss rate, packet delay rate, packet jitter rate, and throughput.

12. The non-transitory machine readable medium of claim 10, wherein the plurality of QoE scores specify traffic throughput associated with the plurality of flows, wherein the set of instructions for analyzing the collected plurality of metrics to rank the plurality of data message flows according to traffic throughput comprises a set of instructions for identifying the specified traffic throughputs from the plurality of QoE scores.

13. The non-transitory machine readable medium of claim 9, wherein the additional MFE forwards data messages belonging only to the at least one data message flow destined for the particular SaaS application based on a first set of forwarding rules specifying the additional MFE as a next hop for reaching the destination network address assigned to the particular SaaS application.

14. The non-transitory machine readable medium of claim 13, wherein a second set of forwarding rules specifies the one or more existing MFEs in the set of MFEs as next hops for reaching other destination network addresses located in the particular geographic region.

15. The non-transitory machine readable medium of claim 9, wherein the set of instructions for modifying the SD-WAN to improve forwarding through the SD-WAN for the identified set of one or more groups of data message flows comprises a set of instructions for increasing capacities for a set of managed links across which data messages belonging to the identified set of one or more groups of data message flows are forwarded.

16. The non-transitory machine readable medium of claim 9, wherein the identified set of one or more groups of data message flows are specified as hot flows.

* * * * *